US006952382B2

(12) United States Patent
Nishiuchi

(10) Patent No.: US 6,952,382 B2
(45) Date of Patent: Oct. 4, 2005

(54) RECORDING/REPRODUCTION APPARATUS, RECORDING/REPRODUCTION METHOD AND INFORMATION RECORDING MEDIUM

(75) Inventor: Kenichi Nishiuchi, Osaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 679 days.

(21) Appl. No.: 10/115,404

(22) Filed: Apr. 3, 2002

(65) Prior Publication Data

US 2002/0150005 A1 Oct. 17, 2002

(30) Foreign Application Priority Data

Apr. 11, 2001 (JP) .............................. 2001-112323

(51) Int. Cl.[7] .............................................. G11B 7/00
(52) U.S. Cl. ............................... 369/44.29; 369/44.35; 369/94
(58) Field of Search ...................... 369/44.25, 44.26, 369/44.27, 44.28, 44.29, 44.35, 44.36, 47.45, 369/47.55, 53.23, 53.28, 53.37, 94, 124.1, 369/124.11

(56) References Cited

U.S. PATENT DOCUMENTS

| | | | | | |
|---|---|---|---|---|---|
| 5,764,620 | A | * | 6/1998 | Satoh et al. | 369/275.1 |
| 5,978,328 | A | * | 11/1999 | Tanaka | 369/44.27 |
| 6,091,690 | A | * | 7/2000 | Sano et al. | 369/44.23 |
| 6,101,156 | A | * | 8/2000 | Tanaka et al. | 369/44.28 |

* cited by examiner

Primary Examiner—Paul W. Huber
(74) Attorney, Agent, or Firm—Renner, Otto, Boisselle & Sklar, LLP

(57) ABSTRACT

A recording and reproduction apparatus for a recording medium including a plurality of information layers includes a focusing signal generation section for generating focusing signals F+ and F− in accordance with a light beam reflected by the recording medium; a focusing control section for generating a focusing error signal in accordance with a difference between the focusing signals F+ and F−, and performing focusing control for maintaining a distance between a focal point of the light beam and a target information layer within a prescribed tolerable range; and a gain setting section for setting a focusing servo gain in accordance with the focusing error signal. The focusing signal generation section generates the focusing signals F+ F− so that values of components thereof based on the light beam reflected by an information layer other than the target information layer are substantially equal while focusing control is being performed.

9 Claims, 16 Drawing Sheets

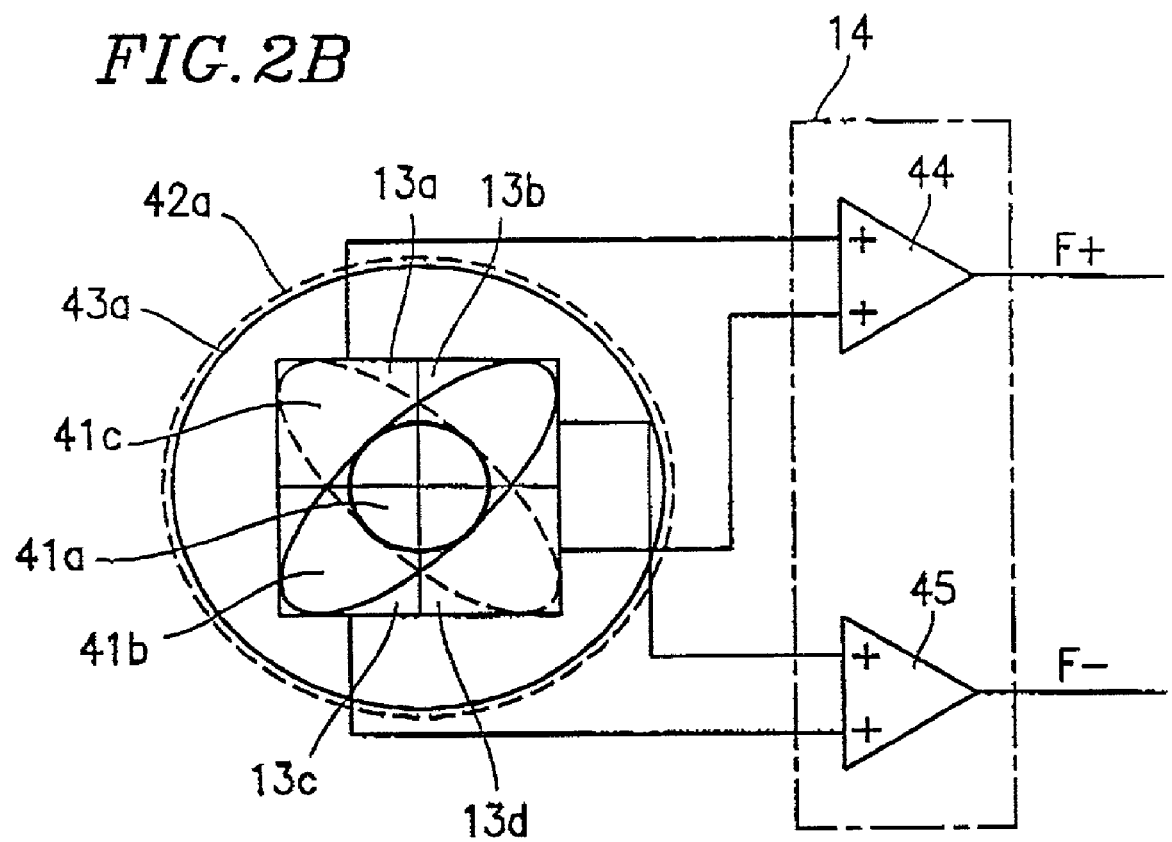

Track direction

RECORDING/REPRODUCTION APPARATUS, RECORDING/REPRODUCTION METHOD AND INFORMATION RECORDING MEDIUM

BACKGROUND OF THE INVENTION

1. Field of the Invention

The present invention relates to a recording and reproduction apparatus, and a recording and reproduction method for recording information to and reproducing information from a recording medium including a plurality of information layers; and such a recording medium.

2. Description of the Related Art

Known optical recording media usable for optical information recording and reproduction include, for example, optical discs and optical cards. Recording information to and reproducing information from an optical recording medium is performed by using a laser light source, such as a semiconductor laser device, and irradiating the optical recording medium with a light beam converged through a lens so as to have a very small diameter.

Technology for further increasing the memory capacity of these optical recording media has been actively developed. Especially, a multi-layered recording medium including a plurality of stacked information layers is capable of doubling, tripling or the like the memory capacity as the number of the information layers is increased by one. In addition, the multi-layered recording medium is easily combined with other high density recording technologies. As a multi-layered recording medium, read only DVD-ROM discs have been practically used. In the future, multi-layered recording media including a plurality of stacked information recording layers formed of a phase change material, a magneto-optic material, a colorant material or the like are expected to be put into practice.

Fundamental technologies for performing recording and reproduction of information to and from an optical recording medium include a focusing servo control for converging a light beam on the optical recording medium using an objective lens, and a tracking servo control for causing a light beam to follow the information tracks. These servo controls are performed based on a signal obtained from light reflected by the optical recording medium and received by a photodetector. When a recording medium including information layers formed of a phase change material or a colorant material is used, signal recording and reproduction is performed using a change in the amount of light reflected by an information layer formed of a thin film. For recording information on such a recording medium, light having a power close to 10 times the power used for reproduction is directed to the recording medium. Accordingly, in accordance with whether the recording track is in a recorded state (where information is recorded therein) or an unrecorded state (where no information is recorded therein) and in accordance with a recording operation is performed or a reproduction operation is performed, the amplitude of a servo control signal varies even though the operation of the objective lens to follow the position of the thin information layer is the same. In order to compensate for such a change in the amplitude of the servo signal, the focusing gain is set to a value in inverse proportion of the value of a summed signal of focusing signals during a focusing operation, and the tracking gain is set to a value in inverse proportion to the value of a summed signal of tracking signals during a tracking operation.

When information is reproduced from a read only multi-layered recording medium including a plurality of information layers, light from the target information layer and also light from adjacent information layers is incident on the reproduction photodetector. The light from the adjacent information layers provides an offset in the servo signal. When reproducing information, the servo signal is compensated for in the direction of the increasing servo gain relative to the case of reproducing information from a recording medium including a single information layer, with the crosstalk from the adjacent information layers being expected.

The multi-layered recording medium has a problem in that when performing recording to and reproduction from the target information layer, the optimum servo conditions change in accordance with the recording state of the adjacent information layers.

For example, when the optical recording medium includes two information layers, there are roughly four states in accordance with the unrecorded/recorded state of each of the two information layers. Here, the information layer closer to the light source is referred to as a "first information layer", and the information layer farther from the light source is referred to as a "second information layer". It is now assumed that the first and second information layers are of the form by which the light reflectance is reduced when the state is changed from the unrecorded state to the recorded state. A servo control operation for the second information layer will be described. The focusing gain for the sum of the amounts of light reflected by the second information layer and incident on the focusing photodetector in one state (i.e., the unrecorded state) is in inverse proportion for those in the other state (i.e., the recorded state). The light reflected by the recording medium includes a light component reflected by the second information layer and a light component reflected by the first information layer. The focusing gain is determined based on the sum of the light components. Therefore, the amount of reflected light changes in accordance with whether the first information layer is in the unrecorded or recorded state, even when the target second information layer is in the same state. In consideration of this, the servo gain of the second information layer is adjusted and determined in advance in the state where the first and second information layers are both unrecorded. When information is recorded on the first information layer, and then the area where the servo gain of the second information layer was adjusted in the state where the first and second information layers were both unrecorded is reproduced again, the ratio of the light component reflected by the second information layer is increased since the amount of light reflected by the first information layer is reduced. As a result, the compensation of the servo gain in the sum of the focusing signals is insufficient to compensate for the crosstalk. Thus, the focusing operation is unstable.

The above-described phenomenon also occurs in the tracking servo control operation. Thus, with the conventional multi-layered recording medium, the focusing gain or the tracking gain changes in accordance with the recording state of the information layers adjacent to the target information layer for information recording and reproduction, which destabilizes the servo control operation.

SUMMARY OF THE INVENTION

According to one aspect of the invention, a recording and reproduction apparatus for a recording medium including a plurality of information layers includes a focusing signal generation section for generating a focusing signal F+ and a focusing signal F− in accordance with a light beam reflected by the recording medium; a focusing control section for generating a focusing error signal in accordance with a difference between the focusing signal F+ and the focusing signal F−, and performing focusing control for maintaining a distance between a focal point of the light beam directed to the recording medium and a target information layer among the plurality of information layers within a prescribed tolerable range in accordance with the focusing error signal; and a gain setting section for setting a focusing servo gain in accordance with the focusing error signal. The focusing signal generation section generates the focusing signal F+ and the focusing signal F− so that a component of the focusing signal F+ and a component of the focusing signal F− which are based on the light beam reflected by an information layer other than the target information layer have substantially an equal value to each other while the focusing control section is performing the focusing control.

In one embodiment of the invention, the gain setting section includes an amplitude detection circuit for detecting an amplitude value of the focusing error signal corresponding to the target information layer in the state where an opened loop for the focusing control is formed; and a gain setting circuit for comparing the amplitude value detected by the amplitude detection section and a reference amplitude value, and setting a focusing servo gain in accordance with the comparison result.

In one embodiment of the invention, the recording and reproduction apparatus further includes an optical pickup for moving the focal point of the light beam in a direction perpendicular to a surface of the recording medium. The amplitude detection circuit detects the amplitude of the focusing error signal while the focal point of the light beam is moving in a direction perpendicular to the recording medium.

According to another aspect of the invention, a recording and reproduction apparatus for a recording medium including a plurality of information layers includes a tracking signal generation section for generating a tracking signal T+ and a tracking signal T− in accordance with a light beam reflected by the recording medium; a tracking control section for generating a tracking error signal in accordance with a difference between the tracking signal T+ and the tracking signal T−, and performing tracking control for causing the light beam directed to the recording medium to follow one of a plurality of tracks formed on a target information layer among the plurality of information layers; and a gain setting section for setting a tracking servo gain in accordance with the tracking error signal. The tracking signal generation section generates the tracking signal T+ and the tracking signal T− so that a component of the tracking signal T+ and a component of the tracking signal T− which are based on the light beam reflected by an information layer other than the target information layer have substantially an equal value to each other while the tracking control section is performing the tracking control.

In one embodiment of the invention, the gain setting section includes an amplitude detection circuit for detecting an amplitude value of the tracking error signal corresponding to the target information layer in the state where an opened loop for the tracking control is formed; and a gain setting circuit for comparing the amplitude value detected by the amplitude detection circuit and a reference amplitude value, and setting a tracking servo gain in accordance with the comparison result.

In one embodiment of the invention, the plurality of tracks include wobble tracks meandering at a prescribed cycle in a track direction. The gain setting section includes an amplitude detection circuit for detecting an amplitude value of a wobble signal included in the tracking error signal in the state where a closed loop for the tracking control is formed; and a gain setting circuit for comparing the amplitude value detected by the amplitude detection circuit and a reference amplitude value, and setting a tracking servo gain in accordance with the comparison result.

In one embodiment of the invention, the gain setting circuit further sets a focusing servo gain in accordance with the comparison result.

According to still another aspect of the invention, a recording and reproduction apparatus for a recording medium including a plurality of information layers, at least one of which includes a management information area having a servo condition recorded therein, includes a reproduction section for reproducing the servo condition recorded in the management information area; and a gain setting section for setting at least one of a focusing servo gain and a tracking servo gain in accordance with the recorded servo condition.

According to still another aspect of the invention, a recording and reproduction apparatus for a recording medium including a plurality of information layers, at least one of which includes a servo condition adjustment area for adjusting a servo condition, includes a servo operation section for performing a servo operation using at least two different servo control gains for a target information layer among the plurality of information layers in the servo condition adjustment area; and a gain setting section for selecting an optimum servo control gain among the at least two different servo control gains based on the servo operation.

In one embodiment of the invention, the gain setting section sets the optimum servo control gain for an area in a recorded state among areas of the target information layer, and sets the optimum servo control gain for an area in an unrecorded state among the areas of the target information layer.

In one embodiment of the invention, the servo operation includes a focusing control. The gain setting section includes an amplitude detection circuit for detecting an amplitude value of a focusing error signal corresponding to the target information layer in the state where an opened loop for the focusing control is formed; and a gain setting circuit for comparing the amplitude value detected by the amplitude detection circuit and a reference amplitude value, and setting a focusing servo gain in accordance with the comparison result.

In one embodiment of the invention, the servo operation includes a tracking control. The gain setting section includes an amplitude detection circuit for detecting an amplitude value of a tracking error signal corresponding to the target information layer in the state where an opened loop for the tracking control is formed; and a gain setting circuit for comparing the amplitude value detected by the amplitude detection circuit and a reference amplitude value, and setting a tracking servo gain in accordance with the comparison result.

In one embodiment of the invention, the servo operation includes a focusing control. The gain setting section includes an amplitude detection circuit for detecting an amplitude value of a focusing error signal corresponding to the target information layer in the state where an opened loop for the focusing control is formed; and a gain setting circuit for comparing the amplitude value detected by the amplitude detection circuit and a reference amplitude value, and setting a first focusing servo gain in accordance with the comparison result. The servo operation section includes a focusing driving circuit for performing the focusing control based on the first focusing servo gain; and an offset voltage circuit for applying an offset voltage to the focusing driving circuit in the state where a closed loop for the focusing control is formed. The gain setting section further includes an offset detection circuit for detecting an offset amount of the focusing error signal in the state where the offset voltage is applied to the focusing driving circuit. The gain setting circuit compares the offset amount detected by the offset detection circuit and a reference offset amount, and sets a second focusing servo gain in accordance with the comparison result.

In one embodiment of the invention, the servo operation includes a tracking control. The gain setting section includes an amplitude detection circuit for detecting an amplitude value of a tracking error signal corresponding to the target information layer in the state where an opened loop for the tracking control is formed; and a gain setting circuit for comparing the amplitude value detected by the amplitude detection circuit and a reference amplitude value, and setting a first tracking servo gain in accordance with the comparison result. The servo operation section includes a tracking driving circuit for performing the tracking control based on the first tracking servo gain; and an offset voltage circuit for applying an offset voltage to the tracking driving circuit in the state where a closed loop for the tracking control is formed. The gain setting section further includes an offset detection circuit for detecting an offset amount of the tracking error signal in the state where the offset voltage is applied to the tracking driving circuit. The gain setting circuit compares the offset amount detected by the offset detection circuit and a reference offset amount, and sets a second tracking servo gain in accordance with the comparison result.

In one embodiment of the invention, the gain setting section compares demodulation errors of reproduction signals respectively obtained for the at least two different servo control gains, and sets the optimum servo control gain in accordance with the comparison result.

In one embodiment of the invention, the recording and reproduction apparatus further includes a recording section for recording a result of servo condition adjustment in a prescribed area of the recording medium.

According to still another aspect of the invention, a recording and reproduction method for a recording medium including a plurality of information layers includes the steps of generating a focusing signal F+ and a focusing signal F− in accordance with a light beam reflected by the recording medium; generating a focusing error signal in accordance with a difference between the focusing signal F+ and the focusing signal F−, and performing focusing control for maintaining a distance between a focal point of the light beam directed to the recording medium and a target information layer among the plurality of information layers within a prescribed tolerable range in accordance with the focusing signal; and setting a focusing servo gain in accordance with the focusing error signal. A component of the focusing signal F+ and a component of the focusing signal F− which are based on the light beam reflected by an information layer other than the target information layer have substantially an equal value to each other while the focusing control section is performing the focusing control.

According to still another aspect of the invention, a recording and reproduction method for a recording medium including a plurality of information layers includes the steps of generating a tracking signal T+ and a tracking signal T− in accordance with a light beam reflected by the recording medium; generating a tracking error signal in accordance with a difference between the tracking signal T+ and the tracking signal T−, and performing tracking control for causing the light beam directed to the recording medium to follow one of a plurality of tracks formed on a target information layer among the plurality of information layers; and setting a tracking servo gain in accordance with the tracking error signal. A component of the tracking signal T+ and a component of the tracking signal T− which are based on the light beam reflected by an information layer other than the target information layer have substantially an equal value to each other while the tracking control section is performing the tracking control.

According to still another aspect of the invention, a recording and reproduction method for a recording medium including a plurality of information layers, at least one of which includes a management information area having a servo condition recorded therein, includes the steps of reproducing the servo condition recorded in the management information area; and setting at least one of a focusing servo gain and a tracking servo gain in accordance with the recorded servo condition.

According to still another aspect of the invention, a recording and reproduction method for a recording medium including a plurality of information layers, at least one of which includes a servo condition adjustment area for adjusting a servo condition, includes the steps of performing a servo operation using at least two different servo control gains for a target information layer among the plurality of information layers in the servo condition adjustment area; and selecting an optimum servo control gain among the at least two different servo control gains based on the servo operation.

According to still another aspect of the invention, a recording medium includes a substrate; a plurality of information layers stacked on the substrate; and a separation layer for at least separating two adjacent information layers among the plurality of information layers. At least one of the plurality of information layers exhibits an optically detectable change when irradiated with a light beam, and is recordable. The separation layer is transmissive with respect to a waveform of the light beam. At least one of the plurality of information layers includes a management area for recording a servo control gain for each of the plurality of information layers.

In one embodiment of the invention, the management area has convexed and concaved portions.

In one embodiment of the invention, the management area is formed on the recordable information layer among the plurality of information layers.

According to still another aspect of the invention, a recording medium includes a substrate; a plurality of information layers stacked on the substrate; and a separation layer for separating at least two adjacent information layers among the plurality of information layers. At least one of the plurality of information layers exhibits an optically detectable change when irradiated with a light beam. The separation layer is transmissive with respect to a waveform of the light beam. At least one of the plurality of information layers includes a servo condition adjustment area for adjusting a servo control gain.

In one embodiment of the invention, at least one of the plurality of information layers is recordable, and the servo condition adjustment area is formed on the recordable information layer among the plurality of information layers.

Thus, the invention described herein makes possible the advantages of providing a recording and reproduction apparatus, a recording and reproduction method, and a recording medium which realizes stable servo control on a target information layer without relying on whether other information layers than the target information layer for recording and reproduction are in a recorded state or in an unrecorded state.

These and other advantages of the present invention will become apparent to those skilled in the art upon reading and understanding the following detailed description with reference to the accompanying figures.

BRIEF DESCRIPTION OF THE DRAWINGS

FIG. 2B shows an exemplary structure of a photodetector 13 and a preamplifier 14 according to the present invention;

DESCRIPTION OF THE PREFERRED EMBODIMENTS

Hereinafter, the present invention will be described by way of illustrative examples with reference to the accompanying drawings.

EXAMPLE 1

Figure 1:
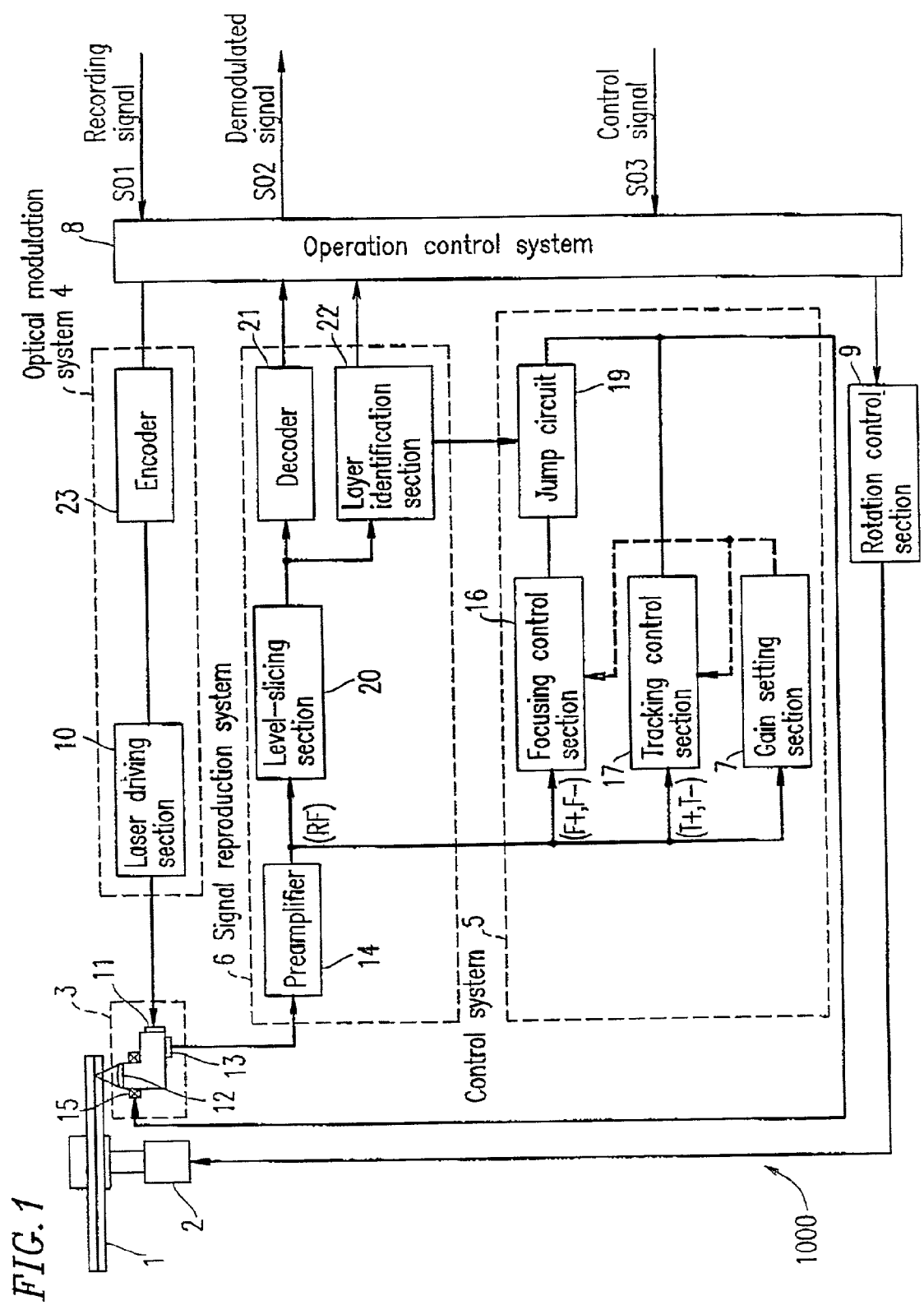
FIG. 1 is a block diagram illustrating a structure of a recording and reproduction apparatus 1000 according to an example of the present invention.

FIG. 1 shows a structure of a recording and reproduction apparatus 1000 according to a first example of the present invention.

The recording and reproduction apparatus 1000 includes a motor 2 for rotating a recording medium 1 including a plurality of information layers, an optical pickup 3 for directing a light beam to the recording medium 1, and a control section for controlling the motor 2 and the optical pickup 3.

The recording medium 1 is, for example, an optical disc. The motor 2 is, for example, a spindle motor.

The optical pickup 3 includes a light source 11 for emitting a light beam, an objective lens 12 for converging the light beam emitted by the light source 11 on the recording medium 1, a photodetector 13 for detecting the light beam reflected by the recording medium 1, and a voice coil 15. The optical pickup 3 is structured to be movable in a direction perpendicular with respect to the surface of the recording medium 1 or in a radial direction of the recording medium 1 by supplying an electric current to the voice coil 15.

The control section includes an optical modulation system 4 for driving the light source 11 of the optical pickup 3, a control system 5 for controlling the optical pickup 3, a signal reproduction system 6 for producing a signal recorded on the recording medium 1, and an operation control system 8 for managing the operations of the optical modulation system 4, the control system 5, and the signal reproduction system 6 and also managing signal input from and signal output to an external device. The control system 5 controls the optical pickup 3 so that the light beam emitted by the optical pickup 3 is focused on a target information layer among the plurality of information layers, and also controls the optical pickup 3 so that the light beam emitted by the optical pickup 3 follows the track formed on the target information layer.

The operation control system 8 controls operational timings and the like of the optical modulation system 4, the control system 5, and the signal reproduction system 6. FIG. 1 does not show such timing control signals, rather FIG. 1 only shows main signals for simplicity.

Hereinafter, an exemplary operation of the recording and reproduction apparatus 1000 for reproducing a signal recorded on the recording medium 1 will be described with respect to various elements of the apparatus 1000 shown in FIG. 1.

The operation control system 8 instructs a rotation control section 9 to drive the motor 2. Upon receiving the instruction from the operation control system 8, the rotation control section 9 drives the motor 2 so that the recording medium 1 rotates at a constant speed.

The operation control system 8 outputs a control signal to the optical modulation system 4 indicating that the operation mode of the recording and reproduction apparatus 1000 is reproduction. The control signal is supplied to a laser driving section 10 via an encoder 23. The laser driving section 10 controls the current flowing to the light source 11 so that the intensity of the light beam emitted by the optical pickup 3 has a power for reproduction.

The light beam emitted by the light source 11 is converged by an optical system (not shown) of the optical pickup 3 and the objective lens 12. The converged light beam is directed to the recording medium 1 and forms a light spot on one of the plurality of information layers included in the recording medium 1. The light beam reflected by the recording medium 1 is incident on the photodetector 13 via the objective lens 12 and the optical system of the optical pickup 3.

The photodetector 13 has a plurality of (for example, four) light receiving surfaces. The photodetector 13 performs opto-electric conversion. As a result, each of the plurality of light receiving surfaces outputs a signal having a voltage value corresponding to the amount of light incident thereon. The signal output from each of the plurality of light receiving surfaces is amplified by a preamplifier 14.

The preamplifier 14 outputs at least five types of signals including focusing servo signals F+ and F−, tracking servo signals T+ and T−, and a high frequency signal RF for signal reproduction.

The focusing servo signal F+ (focusing signal F+) represents a positional deviation between the focal point of the light beam and the target information layer in a positive direction. For example, the focusing signal F+ is an output signal from a light receiving surface of the photodetector 13 located so as to receive an increased amount of light when the position of the focal point of the light beam is deviated toward the objective lens with respect to the target information layer. The focusing servo signal F− (focusing signal F−) represents a positional deviation between the focal point of the light beam and the target information layer in a negative direction. For example, the focusing signal F− is an output signal from a light receiving surface of the photodetector 13 located so as to receive an increased amount of light when the position of the focal point of the light beam is deviated away from the objective lens with respect to the target information layer.

The tracking servo signal T+ (tracking signal T+) represents a positional deviation between the light spot and the target track in a positive direction. For example, in the case where the recording medium is a disc, the tracking signal T+ is an output signal from a light receiving surface of the photodetector 13 located so as to receive an increased amount of light when the light spot is deviated toward the outer circumference of the disc with respect to the target track. The tracking servo signal T− (tracking signal T−) represents a positional deviation between the light spot and the target track in a negative direction. For example, the tracking signal T− is an output signal from a light receiving surface of the photodetector 13 located so as to receive an increased amount of light when the light spot is deviated toward the center of the disc with respect to the target track.

The preamplifier 14 acts as a focusing signal generation section for generating the focusing signals F+ and F−. The preamplifier 14 also acts as a tracking signal generation section for generating the tracking signals T+ and T−.

A focusing control section 16 generates a focusing error signal in accordance with the difference between the focusing signal F+ and the focusing signal F−. Based on the focusing error signal, the focusing control section 16 performs focusing control for maintaining the distance between the focal point of the light beam directed to the recording medium 1 and the target information layer among the plurality of information layers of the recording medium 1 within a tolerable range. Such focusing control is achieved by, for example, moving the objective lens 12 in a direction vertical to the surface of the recording medium 1 in accordance with the focusing error signal.

A gain setting section 7 sets a gain of focusing control (focusing servo gain) so as to compensate for the influence of the light beam reflected by the information layers, among the plurality of information layers of the recording medium 1, other than the target information layer (non-target information layers) in accordance with the focusing error signal.

By thus setting the focusing servo gain so as to compensate for the influence of the light beam reflected by the non-target information layers, it becomes possible to perform a stable servo control operation to the target information layer without relying on whether the non-target information layers are in a recorded state or in an unrecorded state. As a result, errors generated while recording information to or reproducing information from the recording medium 1 are reduced.

A tracking control section 17 generates a tracking error signal in accordance with the difference between the tracking signal T+ and the tracking signal T−. Based on the tracking error signal, the tracking control section 17 performs tracking control for causing the light spot of the light beam directed to the recording medium 1 to follow a target track (guide groove) among a plurality of tracks (guide grooves) formed on the target information layer. Such tracking control is achieved by, for example, moving the objective lens 12 in a radial direction of the recording medium 1 in accordance with the tracking error signal.

The gain setting section 7 sets a gain of the tracking control (tracking servo gain) so as to compensate for the influence of the light beam reflected by the non-target information layers.

By thus setting the tracking servo gain so as to compensate for the influence of the light beam reflected by the non-target information layers, it becomes possible to perform a stable servo control operation to the target information layer without relying on whether the non-target information layers are in a recorded state or in an unrecorded state. As a result, errors generated while recording information to or reproducing information from the recording medium 1 are reduced.

A level-slicing section 20 converts the high frequency signal RF output from the preamplifier 14 into a level-sliced signal. A decoder 21 demodulates the level-sliced signal output from the level-slicing section 20 so as to generate a demodulated signal. The operation control system 8 outputs the demodulated signal output from the decoder 21 to an external device as a demodulated signal S02.

A layer identification section 22 identifies data on which one of the plurality of information layers included in the recording medium 1 is being reproduced based on the level-sliced signal which is output from the level-slicing section 20. When the information layer from which the data is being reproduced is not the target information layer, the layer identification section 22 instructs a jump circuit 19 to move the focal point of the light beam to the target information layer. The layer identification section 22 also manages information recorded on each of the plurality of information layers, and demodulates the form, recording and reproduction conditions and the like of each of the plurality of information layers.

Figure 2A:
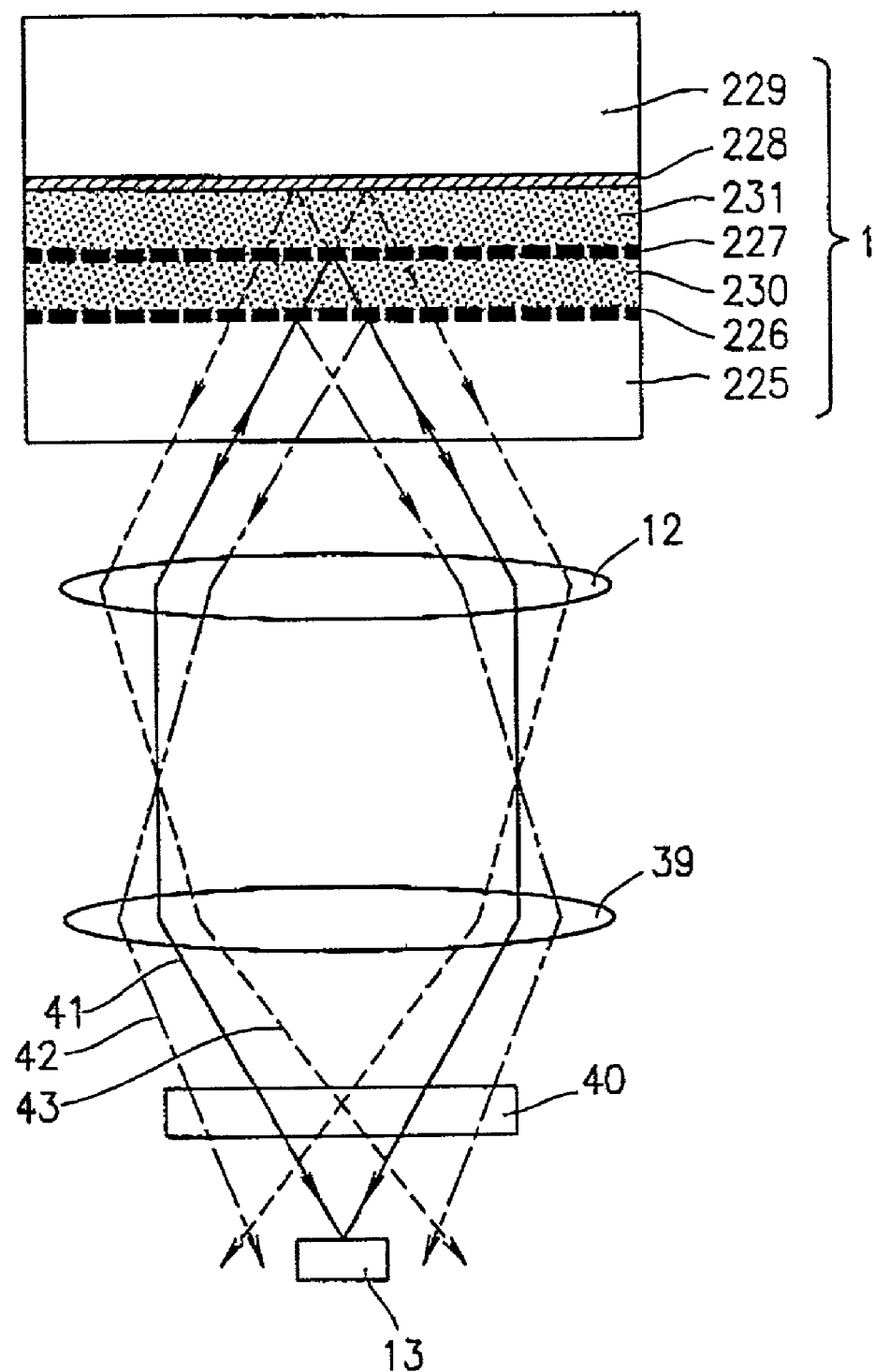
FIG. 2A shows an exemplary structure of a recording medium 1 and an optical system used for the recording medium according to the present invention.

FIG. 2A shows an exemplary structure of the recording medium 1 and the optical system for the recording medium 1.

The recording medium 1 includes three information layers 226, 227 and 228, two separation layers 230 and 231, and two substrates 225 and 229. The information layers 226 and 227 are separated from each other by a prescribed distance by the separation layer 230. The information layers 227 and 228 are separated from each other by a prescribed distance by the separation layer 231.

The recording medium 1 is formed by stacking the substrate 225, the information layer 226, the separation layer 230, the information layer 227, the separation layer 231, the information layer 228 and the substrate 229 in this order from the side on which the light beam is incident.

The information layers 226, 227 and 228 may each be a read only information layer or a recordable information layer. A read only information layer includes a surface having convex and concave pits representing information and a reflective film formed on the surface. A signal can be recorded on a recordable information layer by various systems. Applicable systems include, for example, a deformation recording system utilizing a change in the shape of the thin film which is caused by the heat of the light beam, a phase change recording system utilizing a change in the phase state of the thin film which is caused by the heat of the light beam, a magneto-optic recording system utilizing a change in the magnetization direction of the thin film which is caused by the heat of the light beam, and a recording system using a photochromic material, the state of which is changed by optical energy.

In order to allow information to be recorded to or reproduced from the information layer 228, which is the farthest of the three information layers from the side on which the light beam is incident, the information layers 226 and 227 should be transmissive to the wavelength of the light beam.

The present invention is especially effective when at least one of the plurality of information layers is a recordable information layer.

In FIG. 2A, an optical path 41 represented by the solid line shows the optical path of the light beam incident on and reflected by the information layer 227 when the focal point of the light beam is on the information layer 227. In the example shown in FIG. 2A, the light beam is converged on the information layer 227 substantially to the diffraction limit of light.

An optical path 42 represented by the one-dot chain line shows the optical path of the light beam incident on and reflected by the information layer 226, and an optical path 43 represented by the dashed line shows the optical path of the light beam incident on and reflected by the information layer 228.

As shown in FIG. 2A, the light beam reflected by the information layer 227 is focused again on the photodetector 13 via the objective lens 12, a detection lens 39 and a cylindrical lens 40.

The light beam reflected by the information layer 226 is diverged after passing through the objective lens 12, and thus is incident on the photodetector 13 so as to cover the entirety of the plurality of light receiving surfaces thereof. As a result, the light beam reflected by the information layer 226 is incident on the plurality of light receiving surfaces of the photodetector 13 substantially uniformly. The light beam reflected by the information layer 228 is converged after passing through the objective lens 12 and thus is focused between the detection lens 39 and the photodetector 13. As a result, the light beam reflected by the information layer 228 is incident on the plurality of light receiving surfaces of the photodetector 13 substantially uniformly.

FIG. 2B shows an exemplary structure of the photodetector 13 and the preamplifier 14.

The photodetector 13 includes four light receiving surfaces 13a, 13b, 13a and 13d obtained by dividing one surface into four.

The light beam reflected by the information layer 227 is incident on the photodetector 13 along the optical path 41. As a result, a light spot is formed on the light receiving surfaces 13a though 13d. In FIG. 2B, reference numeral 41a represents a light spot which is formed when the focal point of the light beam reflected by the information layer 227 is on the light receiving surfaces 13a through 13d of the photodetector 13. The light spot 41a is a circle covering a substantially uniform area of the light receiving surfaces 13a through 13d.

In FIG. 2B, reference numeral 41b represents a light spot which is formed when the focal point of the light beam is slightly deviated toward the objective lens 12 with respect to the information layer 227. The light spot 41b is an ellipse extending along a phantom line connecting the center of the light receiving surface 13b and the center of the light receiving surface 13c. Reference numeral 41c represents a light spot which is formed when the focal point of the light beam is slightly deviated in the direction away from the objective lens 12 with respect to the information layer 227. The light spot 41c is an ellipse extending along a phantom line connecting the center of the light receiving surface 13a and the center of the light receiving surface 13d.

In FIG. 2B, reference numeral 42a represents a light spot which is formed when the light beam reflected by the information layer 226 is incident on the photodetector 13 along the optical path 42. The light spot 42a covers the entirety of the light receiving surfaces 13a through 13d. Reference numeral 43a represents a light spot which is formed when the light beam reflected by the information layer 228 is incident on the photodetector 13 along the optical path 43. The light spot 43a covers the entirety of the light receiving surfaces 13a through 13d.

The shape of each of the light spots 42a and 43a does not significantly change despite the positional deviation of the focal point of the light beam with respect to the information layer 227. The light beam reflected by each of the information layers 226 and 228 is directed to the light receiving surfaces 13a through 13d substantially uniformly despite the positional deviation of the focal point of the light beam with respect to the information layer 227.

Each of the light receiving surfaces 13a through 13d outputs a signal having a voltage value corresponding to the amount of light incident thereon.

The signal output from each of the light receiving surfaces 13a and 13d located on an orthogonal line of the photodetector 13 is supplied to an addition amplifier 44 in the preamplifier 14. The addition amplifier 44 adds the signal output from the light receiving surface 13a and the signal output from the light receiving surface 13d, and amplifies the addition result, so as to generate the focusing signal F+.

The signal output from each of the light receiving surfaces 13b and 13a located on another orthogonal line of the photodetector 13 is supplied to an addition amplifier 45 in the preamplifier 14. The addition amplifier 45 adds the signal output from the light receiving surface 13b and the signal output from the light receiving surface 13a, and amplifies the addition result, so as to generate the focusing signal F−.

The focusing control section 16 (FIG. 1) generates a focusing error signal based on the difference between the focusing signal F+ and the focusing signal F−, and controls the position of the focal point of the light beam with respect to the target information layer 227 so that the value of the focusing error signal is almost zero (i.e., so that the value of the focusing signal F+ and the value of the focusing signal F− are substantially equal to each other). Such control is achieved by, for example, controlling the position of the objective lens 12 in accordance with the focusing error signal.

As described above, while the focusing control for the target information layer 227 is being performed, the light beam reflected by each of the non-target information layers 226 and 228 is directed to the light receiving surfaces 13a through 13d substantially uniformly. Therefore, the value of a component of the focusing signal F+ and the value of a component of the focusing signal F− generated by the light beat reflected by each of the information layers 226 and 228 are substantially equal to each other. The focusing control is performed based on the difference between the focusing signal F+ and the focusing signal F−. Therefore, it becomes possible to eliminate the influence of the light beam reflected by the non-target information layers 226 and 228 on the focusing control.

In the example shown in FIGS. 2A and 2B, the focusing method is an astigmatism method. The present invention is not limited to this. The present invention is applicable to any focusing method as long as (i) the focusing control for the target information layer is performed based on the difference between the focusing signal F+ and the focusing signal F−, and in addition (ii) the focusing signal F+ and the focusing signal F− are generated so as to have substantially equal values to each other with respect to the light beam reflected by the non-target information layers while the focusing control is being performed for the target information layer.

In the example shown in FIGS. 2A and 2B, the recording medium 1 includes three information layers. The present invention is not limited to this. The present invention is applicable to a recording medium including any number of information layers so long as the number is greater than one. In the above description, the focusing control is performed for the second information layer among the three information layers. The present invention is not limited to this. The present invention is applicable to focusing control performed for any of the plurality of information layers.

The same is applicable to tracking control. A photodetector having at least two light receiving surfaces obtained by dividing one surface into at least two along a line in the tracking direction is used. Signals output from one half of the photodetector along the tracking direction are added together, and the addition result is amplified so as to generate the tracking signal T+, and signals output from the other half of the photodetector along the tracking direction are added together, and the addition result is amplified so as to generate the tracking signal T−. Tracking control is performed based on the difference between the tracking signals T+ and T−. Thus, it becomes possible to eliminate the influence of the light beam reflected by the non-target information layers on the tracking control.

Figure 3:
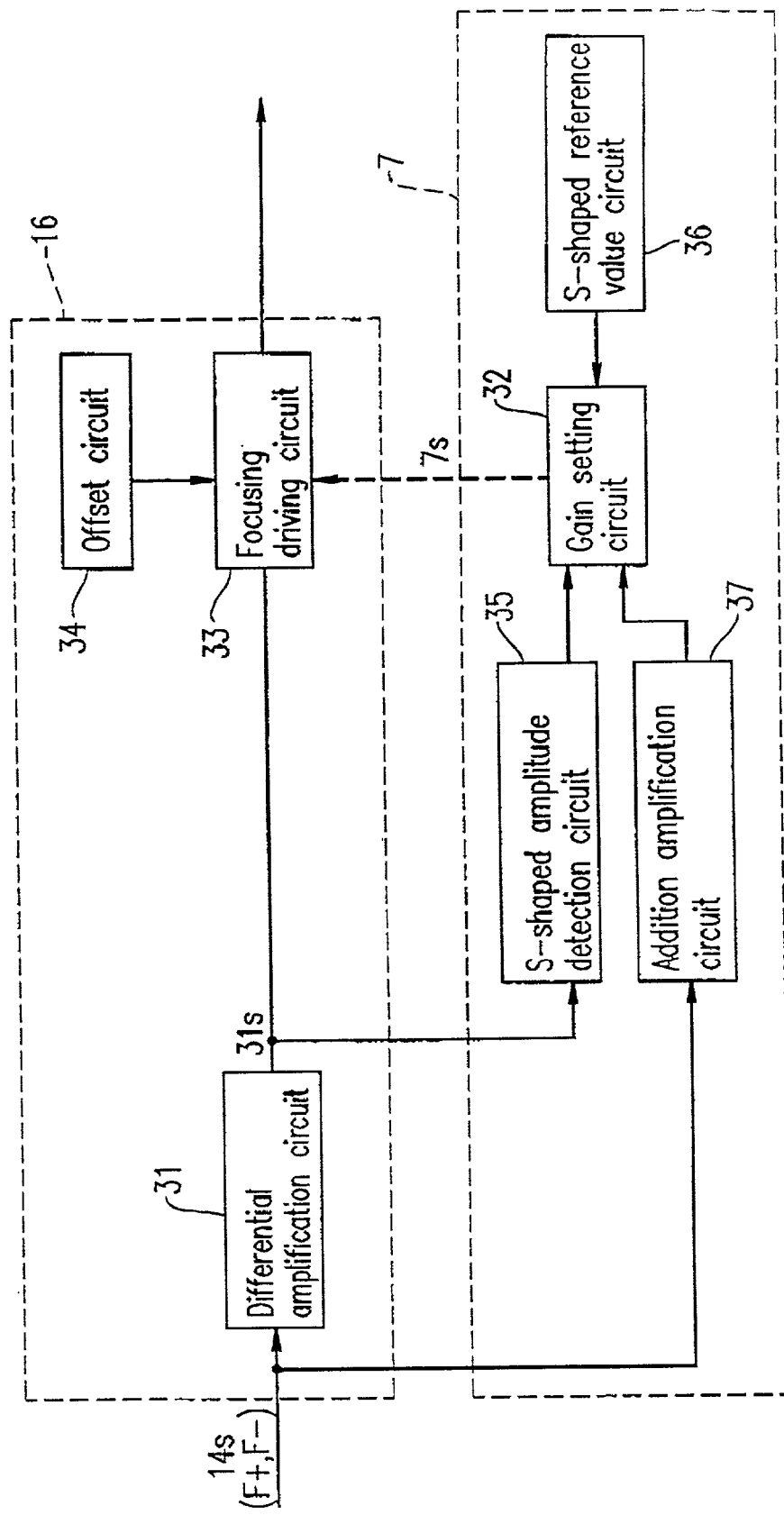
FIG. 3 is a block diagram illustrating an exemplary structure of a focusing control section 16 and a gain setting section 7 according to the present invention.

FIG. 3 shows an exemplary structure of the focusing control section 16 (FIG. 1) and the gain setting section 7 (FIG. 1).

The focusing control section 16 includes a differential amplification circuit 31 for receiving a focusing signal F+ and a focusing signal F− and generating a focusing error signal 31s in accordance with the difference between the focusing signal F+ and the focusing signal F−, a focusing driving circuit 33 for driving the voice coil 15 of the optical pickup 3 in accordance with a focusing error signal output from the differential amplification circuit 31 and the focusing servo gain which is set by the gain setting section 7, and an offset circuit 34 for supplying a prescribed current to the focusing driving circuit 33.

The gain setting section 7 includes an S-shaped amplitude detection circuit 35, a gain setting circuit 32 and an S-shaped reference value circuit 36.

Hereinafter, an exemplary operation of the focusing control section 16 and the gain setting section 7 will be described with reference to FIG. 3.

The focusing driving circuit 33 forms an opened loop for focusing control and thus causes the prescribed current supplied by the offset circuit 34 to the voice coil 15 (FIG. 1), so as to move the objective lens 12 in a direction perpendicular to the recording medium 1 (FIG. 1).

The S-shaped amplitude detection circuit 35 detects an amplitude value of a focusing error signal 31s corresponding to the target information layer. The S-shaped reference value circuit 36 outputs a reference amplitude value experimentally obtained. The gain setting circuit 32 compares the detected amplitude value and the reference amplitude value output from the S-shaped reference value circuit 36 so as to determine a reference focusing servo gain. The gain setting circuit 32 outputs a focusing servo gain setting signal 7s representing the reference focusing servo gain to the focusing driving circuit 33.

In accordance with the focusing servo gain setting signal 7s, the focusing driving circuit 33 sets a gain of the focusing control (focusing servo gain) so as to form a closed loop for focusing control. As a result, focusing control based on the focusing servo gain which is set in accordance with the focusing servo gain setting signal 7s is started.

The control for forming a closed/opened loop for focusing control is achieved by, for example, providing a switch in the feedback loop for focusing control and causing the focusing driving circuit 33 to turn the switch on/off.

The gain setting section 7 preferably further includes an addition amplification circuit 37. The addition amplification circuit 37 receives the focusing signal F+ and the focusing signal F−, and generates a summed focusing sum in accordance with the focusing signal F+ and the focusing signal F−. In this case, the gain setting circuit 32 fine-tunes the focusing servo gain based on the summed focusing signal output from the addition amplification circuit 37 in the state where a closed loop for focusing control is formed. The fine-tuning by the gain setting circuit 32 is performed in addition to the control based on the reference focusing servo gain, and suppresses the influence of a change in the power of the light beam or external disturbance on the focusing servo gain during recording and reproduction.

Figure 4:
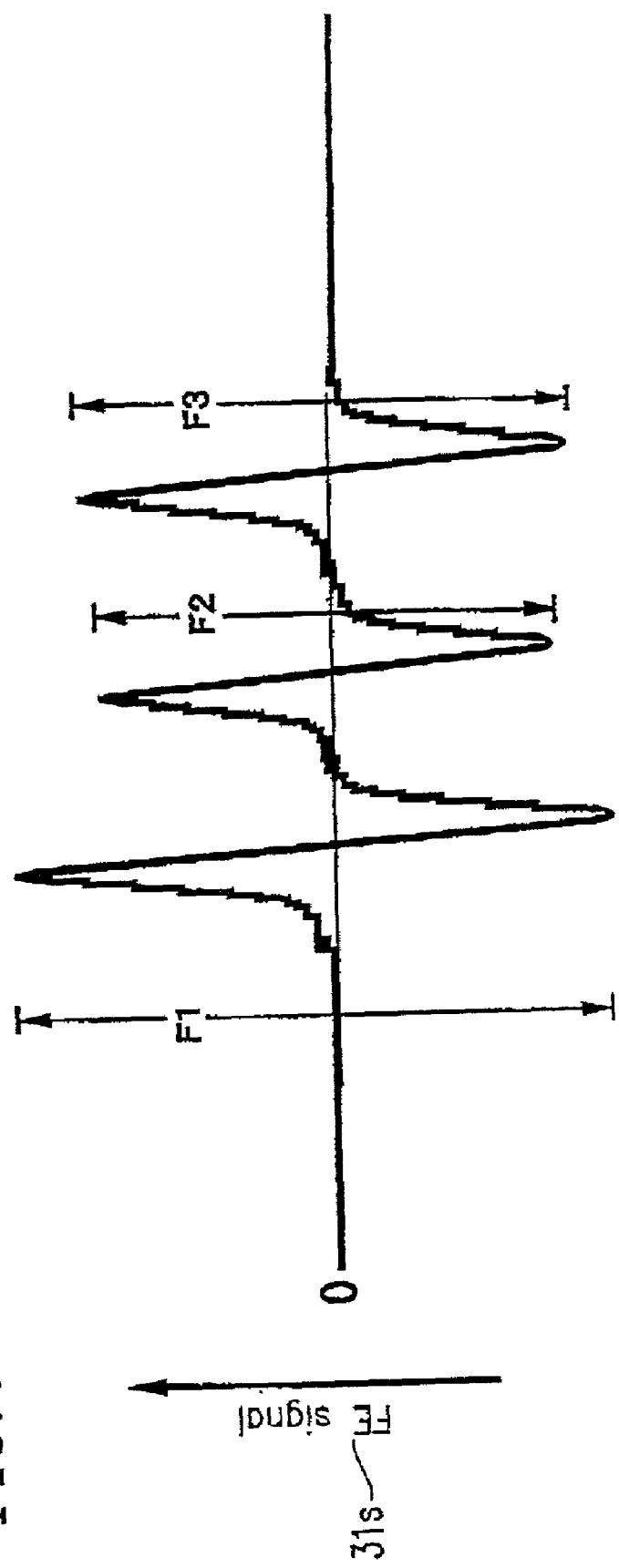
FIG. 4 is a graph illustrating a change in a focusing error signal (FE signal) 31s.

FIG. 4 is a graph illustrating a change in the focusing error signal (FE signal) 31s which is output from the differential amplification circuit 31. The FE signal changes as shown in FIG. 4 when controlled by the focusing driving circuit 33. In the example shown in FIG. 4, the recording medium 1 includes the three information layers 226, 227 and 228 shown in FIG. 2A.

As shown in FIG. 4, three S-shaped (or saw-toothed) FE signal portions are obtained in correspondence with the three information layers 226, 227 and 228.

When the target information layer is the information layer 226, the S-shaped amplitude detection circuit 35 detects amplitude value F1 shown in FIG. 4 as the amplitude value of the FE signal corresponding to the target information layer. When the target information layer is the information layer 227, the S-shaped amplitude detection circuit 35 detects amplitude value F2 shown in FIG. 4 as the amplitude value of the focusing error signal corresponding to the target information layer. When the target information layer is the information layer 228, the S-shaped amplitude detection circuit 35 detects amplitude value F3 shown in FIG. 4 as the amplitude value of the FE signal corresponding to the target information layer.

The FE signal is S-shaped as shown in FIG. 4 under ideal conditions. In actuality, however, the S shape of the FE signal is deformed due to fluctuations of the surface of the recording medium 1 or reproduction noise. Therefore, in order to detect the target information layer with certainty, it is preferable to preset a range of amplitude values and a time range of the wave shape which is estimated from the change component caused by the focusing offset or the fluctuations of the recording medium 1.

As described above, a signal component generated based on the light beam reflected by a non-target information layer is equally included in both the focusing signal F+ and the focusing signal F−. Therefore, the signal components in the focusing signals F+ and F− substantially counteract each other by performing focusing control in accordance with the difference between the focusing signal F+ and the focusing signal F−. This is true regardless of whether the non-target information layer is in a recorded state or in an unrecorded state. Accordingly, the influence of the light beam reflected by the non-target information layer on the focusing control can be substantially cancelled regardless of whether the non-target information layer is in a recorded state or an unrecorded state. As a result, focusing control for causing the light beam to be focused on the target information layer can be performed with an appropriate gain.

Figure 5:
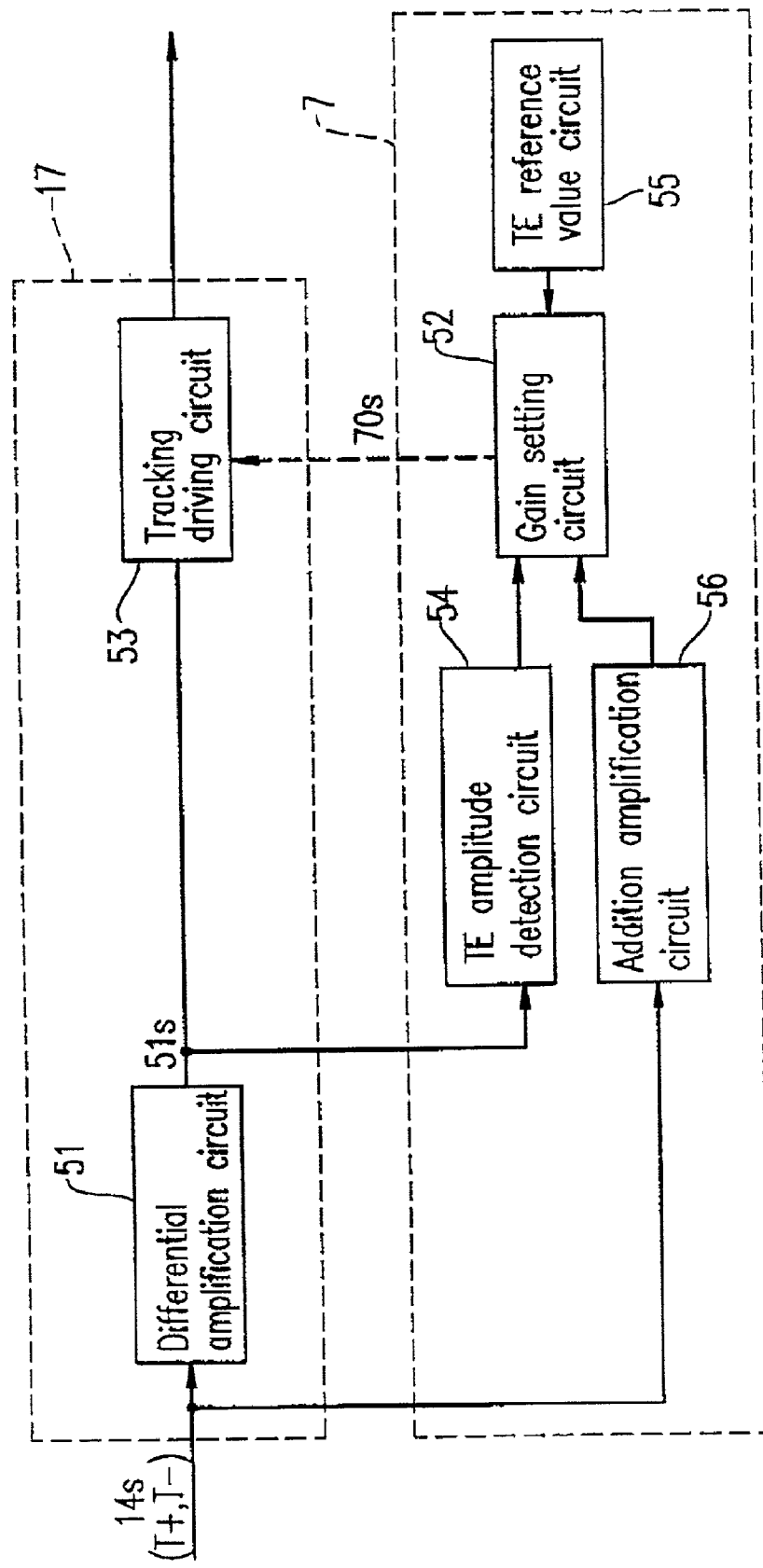
FIG. 5 is a block diagram illustrating an exemplary structure of a tracking control section 17 and a gain setting section 7 according to the present invention.

FIG. 5 shows an exemplary structure of the tracking control section 17 (FIG. 1) and the gain setting section 7 (FIG. 1).

The tracking control section 17 includes a differential amplification circuit 51 for receiving a tracking signal T+ and a tracking signal T− and generating a tracking error signal 51s in accordance with the difference between the tracking signal T+ and the tracking signal T−, and a tracking driving circuit 53 for driving the voice coil 15 of the optical pickup 3 in accordance with a tracking error signal output from the differential amplification circuit 51 and the tracking servo gain which is set by the gain setting section 7.

The gain setting section 7 includes a TE amplitude detection circuit 54, a gain setting circuit 52 and a TE reference value circuit 55.

Hereinafter, an exemplary operation of the tracking control section 17 and the gain setting section 7 will be described with reference to FIG. 5. It is assumed here that as a result of the focusing control section 16 performing focusing control, the focal point of the light beam is on the target information layer.

The tracking driving circuit 53 forms an opened loop for tracking control so as to move the objective lens 12 in a radial direction of the recording medium 1 (FIG. 1). As the objective lens 12 moves, the amplitude of the tracking error signal (TE signal) 51s which is output from the differential amplification circuit 51 changes.

Figure 6:
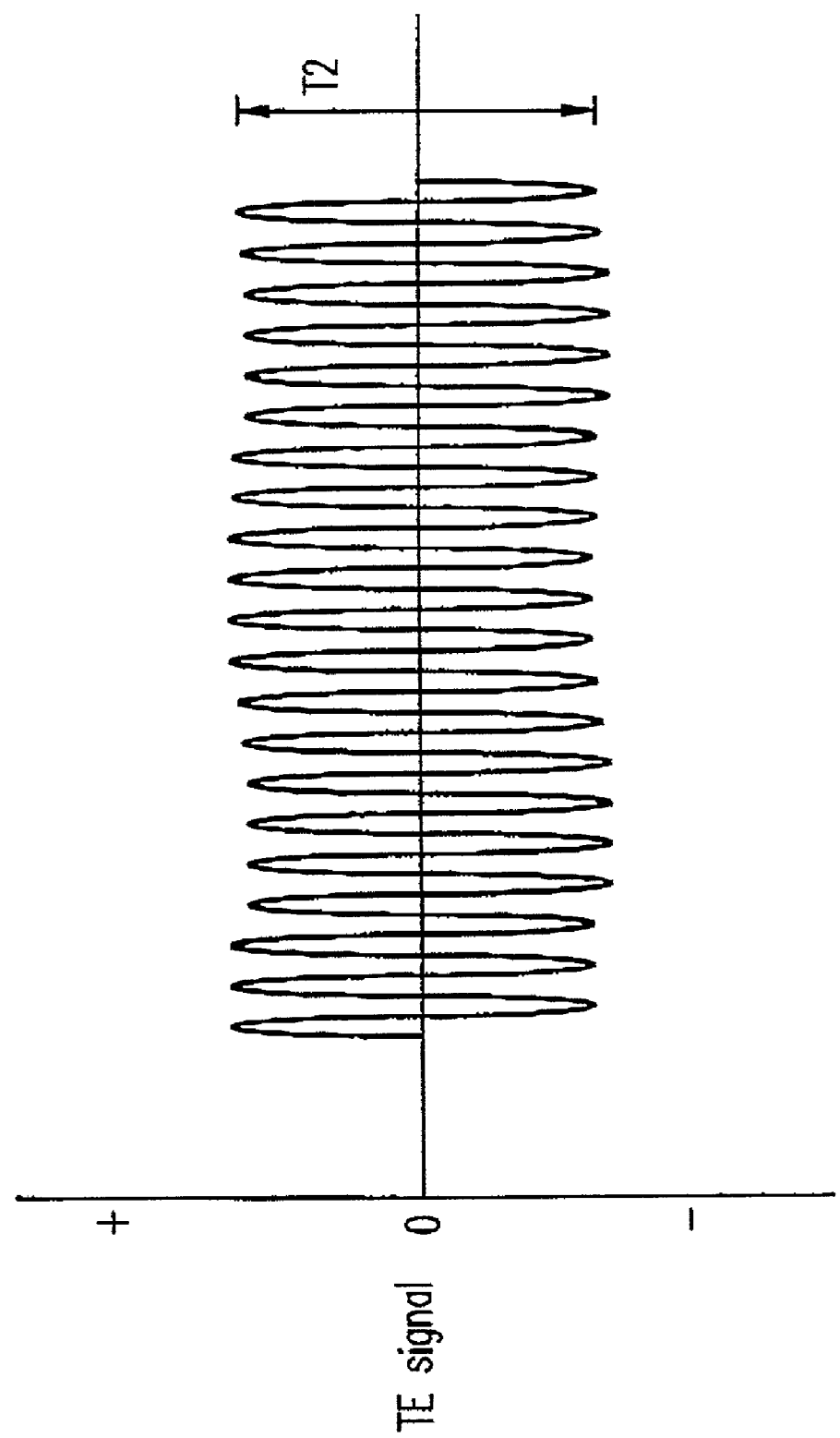
FIG. 6 is a waveform diagram illustrating the waveform of a tracking error signal 51s.

FIG. 6 is a waveform diagram illustrating the waveform of the tracking error signal 51s obtained in this manner.

The TE amplitude detection circuit 54 detects an amplitude value of a tracking error signal 51s (T2 in the example of FIG. 6). The TE reference circuit 55 outputs a prescribed reference amplitude value. The gain setting circuit 52 compares the detected amplitude value (T2 in the example of FIG. 6) and the reference amplitude value output from the TE reference value circuit 55 so as to determine a reference tracking servo gain. The gain setting circuit 52 outputs a tracking servo gain setting signal 70s representing the reference tracking servo gain to the tracking driving circuit 53.

In accordance with the tracking servo gain setting signal 70s, the tracking driving circuit 53 sets a gain of the tracking control (tracking servo gain) so as to form a closed loop for tracking control. As a result, tracking control based on the tracking servo gain which is set in accordance with the tracking servo gain setting signal 70s is started.

The control for forming a closed/opened loop for tracking control is achieved by, for example, providing a switch in the feedback loop for tracking control and causing the tracking driving circuit 53 to turn the switch on/off.

The gain setting section 7 preferably further includes an addition amplification circuit 56. The addition amplification circuit 56 receives the tracking signal T+ and the tracking signal T−, and generates a summed tracking signal in accordance with the tracking signal T+ and the tracking signal T−. In this case, the gain setting circuit 52 corrects the tracking servo gain based on the summed tracking signal output from the addition amplification circuit 56 in the state where a closed loop for tracking control is formed. The correction by the gain setting circuit 52 is performed in addition to the control based on the reference tracking servo gain, and suppresses the influence of a change in the power of the light beam or external disturbance on the tracking servo gain during recording and reproduction. For example, the gain setting circuit 52 preferably corrects the tracking servo gain so as to be in inverse proportion to the level of the summed tracking signal.

As described above, a signal component generated based on the light beam reflected by a non-target information layer is equally included in the tracking signal T+ and the tracking signal T−. Therefore, the signal components in the tracking signals T+ and T− substantially counteract by performing tracking control in accordance with the difference between the tracking signal T+ and the tracking signal T−. This is true regardless of whether the non-target information layer is in a recorded state or in an unrecorded state. Accordingly, the influence of the light beam reflected by the non-target information layer on the tracking control can be substantially cancelled regardless of whether the non-target information layer is in a recorded state or an unrecorded state. As a result, tracking control for causing the light beam to follow a track in the target information layer can be performed with an appropriate gain.

For each of the information layers, there are a plurality of recorded/unrecorded combinations of the other information layers. For each combination, one servo gain is set. In the case where there are three information layers, there are four combinations for each information layer; i.e., 12 combinations in total. Thus, 12 servo gains are set. In the case where there are two information layers, there are two combinations for each information layer; i.e., four combinations in total. Thus, 12 servo gains are set.

In each of an area for which the reference focusing servo gain is set, an area for which the reference tracking servo gain is set, and a recordable area of a track for information recording and reproduction, an area in a recorded state and an area in an unrecorded area are preferably separated from each other, for the following reason. In the case where each track includes an area in a recorded state and an area in an unrecorded state in a mixed manner, the influence of that track on the other tracks vary step by step. Therefore, even when there are two information layers, more than four servo gains need to be set depending on the recording patterns of the layers. In this case, the process for finding the reference focusing servo gain and the reference tracking servo gain are performed each time an error occurs. In this manner, superb recording and reproduction is realized. According to another effective method, the values of the reference focusing servo gain and the reference tracking servo gain for each of the above-mentioned areas of each information layer are found in advance, and the servo gain is switched for each area.

EXAMPLE 2

In a second example of the present invention, a method for determining a servo gain for a recording medium 1 having a plurality of information layers by using wobble grooves (wobble tracks) which meander at a certain cycle in a direction in which tracks run (track direction).

Figure 7:
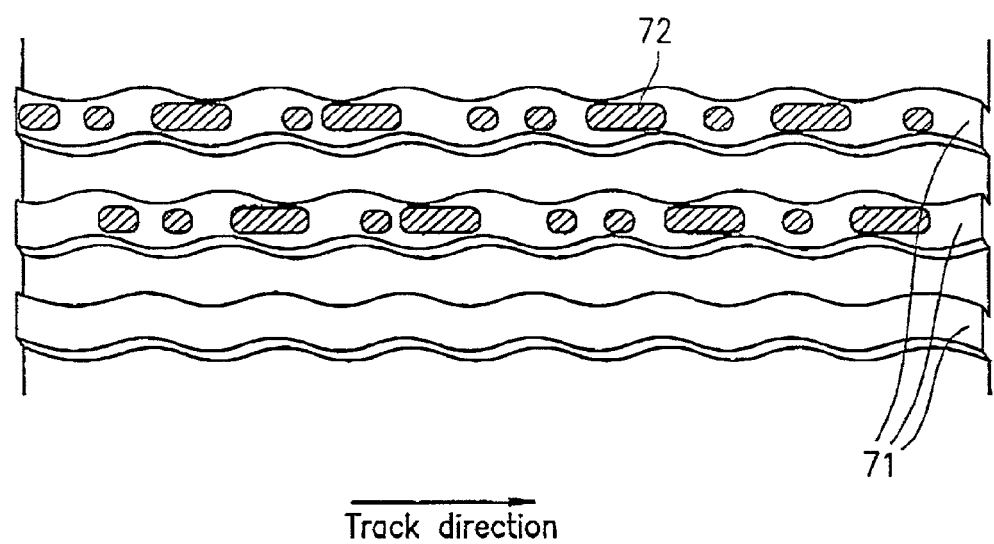
FIG. 7 shows a plurality of guide tracks 71 formed on one of a plurality of information layers (target information layer) of the recording medium 1.

FIG. 7 shows a plurality of guide tracks 71 formed on one of the plurality of information layers (target information layer). Recording marks 72, each indicating that an information signal is recorded, are formed on the guide tracks 71.

The guide tracks 71 are formed so as to slightly meander at a certain cycle in a direction perpendicular to the track direction. The meandering cycle is set to be higher than the tracking frequency of the tracking servo control operation.

Figure 8:
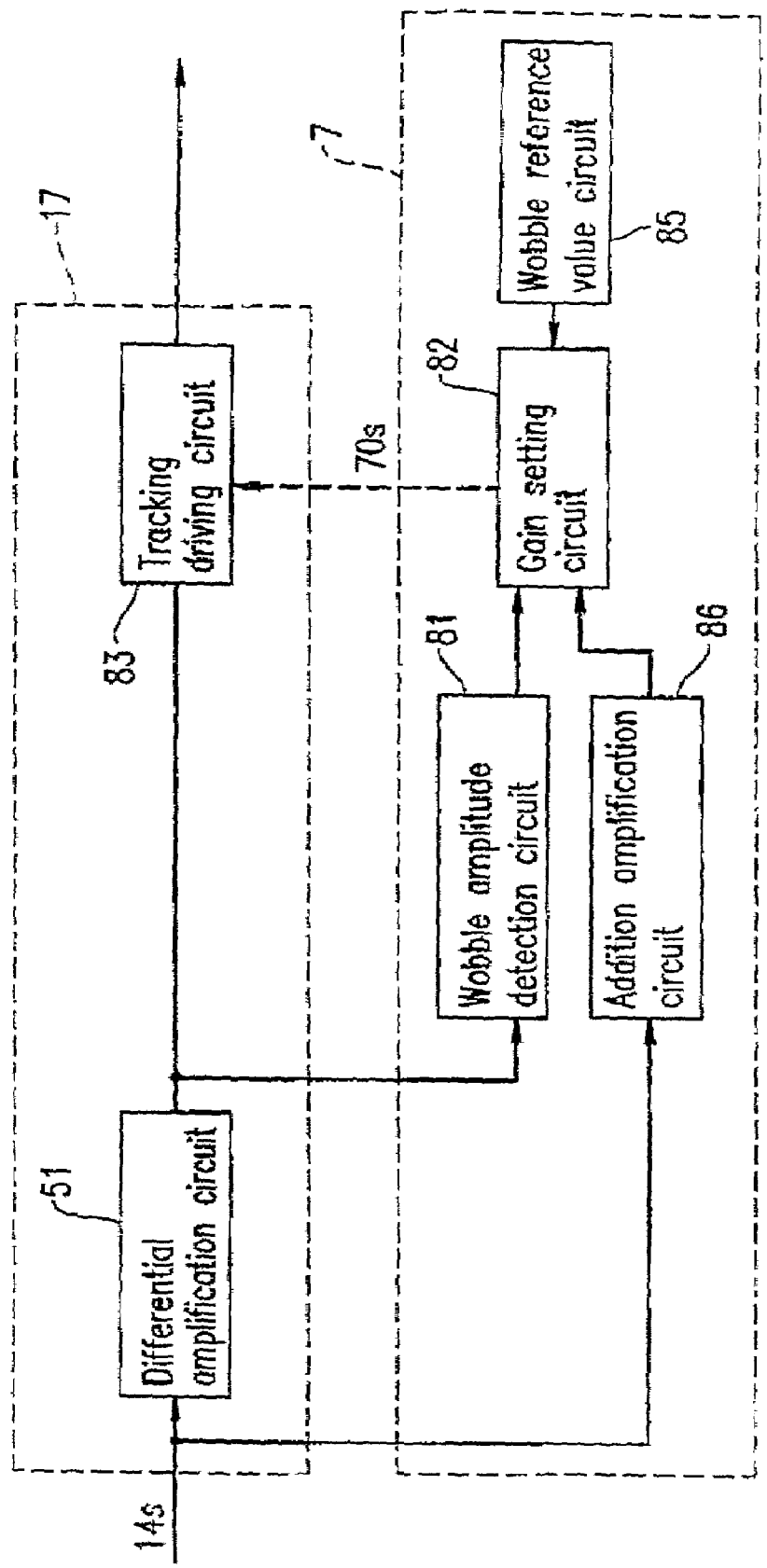
FIG. 8 is a block diagram illustrating an exemplary structure of the tracking control section 17 and the gain setting section 7 according to the present invention.

FIG. 8 shows another exemplary structure of the tracking control section 17 (FIG. 1) and the gain setting section 7 (FIG. 1) included in a recording and reproduction apparatus for recording information to and reproducing information from the recording medium 1 having wobble grooves.

The structure shown in FIG. 8 is basically identical to the structure shown in FIG. 5 except for the following. In the structure shown in FIG. 8, both a focusing servo gain and a tracking servo gain are set in the state where a closed loop for focusing control is formed and a closed loop for tracking control is formed (i.e., when a signal recorded on a specific track is being reproduced).

With reference to FIG. 8, an exemplary operation of the tracking control section 17 and the gain setting section 7 will be described.

The differential amplification circuit 51 outputs a tracking error signal in accordance with the difference between a tracking signal T+ and a tracking signal T−. When a closed loop for tracking control is formed, the tracking error signal output from the differential amplification circuit 51 includes a signal corresponding to the wobbles of the guide tracks 71 (wobble signal) as a remaining component of the tracking control.

A wobble amplitude detection circuit 81 detects an amplitude value of the wobble signal included in the tracking error signal. A wobble reference value circuit 85 outputs a reference amplitude value experimentally obtained. A gain setting circuit 82 compares the detected amplitude value and the reference amplitude value output from the wobble reference value circuit 85, so as to determine a reference tracking servo gain. The gain setting circuit 82 outputs a tracking servo gain setting signal 70s representing the reference tracking servo gain to a tracking driving circuit 83.

In accordance with the tracking servo gain setting signal 70s, the tracking driving circuit 83 re-sets a gain of the tracking control (tracking servo gain). As a result, tracking control based on the tracking servo gain which is re-set in accordance with the tracking servo gain setting signal 70s is started.

Alternatively, the gain setting circuit 82 may compare the detected amplitude value and the reference amplitude value output from the wobble reference value circuit 85 so as to determine a reference focusing servo gain, and then output a focusing servo gain setting signal 7s representing the reference focusing servo gain to a focusing driving circuit 33 (FIG. 3). In this case, the focusing driving circuit 33 re-sets a gain of the focusing control (focusing servo gain) in accordance with the focusing servo gain setting signal 7s. As a result, focusing control based on the focusing servo gain which is re-set in accordance with the focusing servo gain setting signal 7s is started.

The gain correction performed based on the amplitude value of the wobble signal which is detected by the wobble amplitude detection circuit 81 may result in a large control error against a drastic change in external disturbance. Therefore, it is preferable to fine-tune the tracking servo gain based on the summed tracking signal output from the addition amplification circuit 86 to compensate for the influence of a change in the power of the light beam or external disturbance during recording and reproduction on the tracking servo gain, in addition to performing the control based on the tracking servo gain.

The recording and reproduction apparatus and method according to the second example provides the effect that the tracking servo gain can be set in the state where a closed loop for tracking control is formed, in addition to the effect provided by the first example. Thus, an optimum gain can always be set even during a recording or reproduction operation.

Although the phase of the wobble grooves is not described in detail herein, the CLV format having a constant recording linear velocity is advantageous for improving the recording capacity of a disc-shaped recording medium. In this format, the wobble grooves in two adjacent tracks have different phases from each other. The obtained wobble amplitude has a waveform which is modulated in a circumferential direction of the recording medium.

For forming wobble grooves in a recording medium, it is preferable to use a format by which wobble grooves in two adjacent tracks have the same phase as each other. For a disc-shaped recording medium as in this example, the zone CLV format is applied. According to the zone CLV format, the disc is divided into a plurality of zones in the track direction and the wobble grooves in two adjacent tracks have the same phase as each other in each zone. Between two adjacent zones, the number of wobbles in the zone closer to the outer circumference of the disc is larger than the number of wobbles in the zone closer to the center of the disc. By adopting such a structure of the wobble grooves, a constant wobble amplitude is obtained in substantially the entire disc, and thus a high speed servo gain setting is realized.

As described above, the CLV format is advantageous for improving the recording capacity. According to the CLV format, the wobble grooves in adjacent tracks have different phases from each other. The resultant wobble amplitude varies in the radial direction.

EXAMPLE 3

In the first and second examples, methods for correcting servo gains in the vicinity of the track as a target of recording and reproduction have been explained. In a third example of the present invention, a method for adjusting servo gains by pre-recording information or pre-reproducing information in a specific area of the recording medium and determining a correction value for the focusing servo gain and the tracking servo gain will be described.

Figure 9:
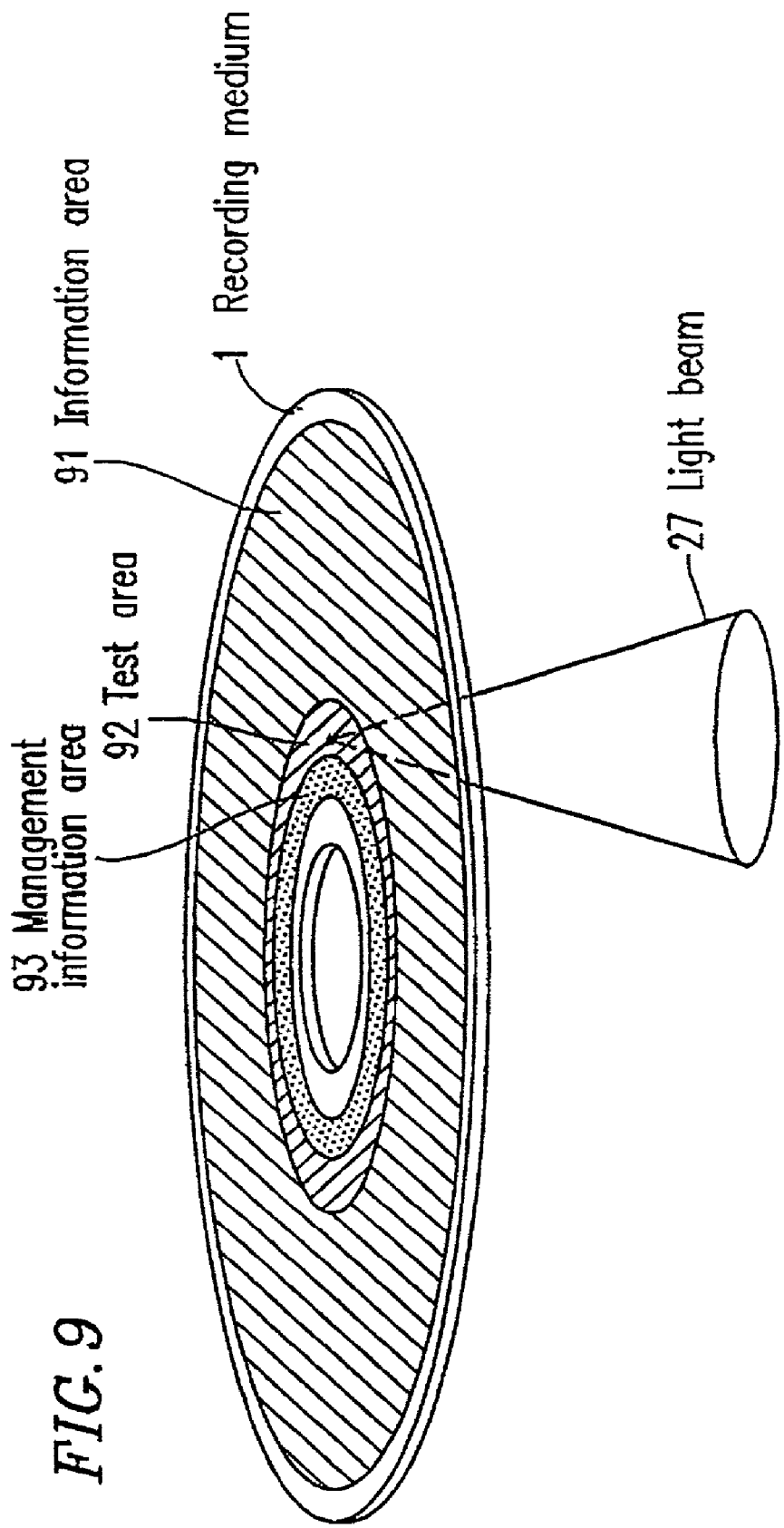
FIG. 9 shows a structure of the recording medium 1 for servo gain adjustment according to the present invention.

FIG. 9 shows a structure of a recording medium 1 for adjusting servo gains. The recording medium 1 includes an information area 91, a test area 92 having test signals representing basic patterns in which crosstalk between the information layers can occur, and a management information area 93 in which servo control operation conditions or the like can be described.

The test area 92 is provided close to the information area 91.

Figure 10:
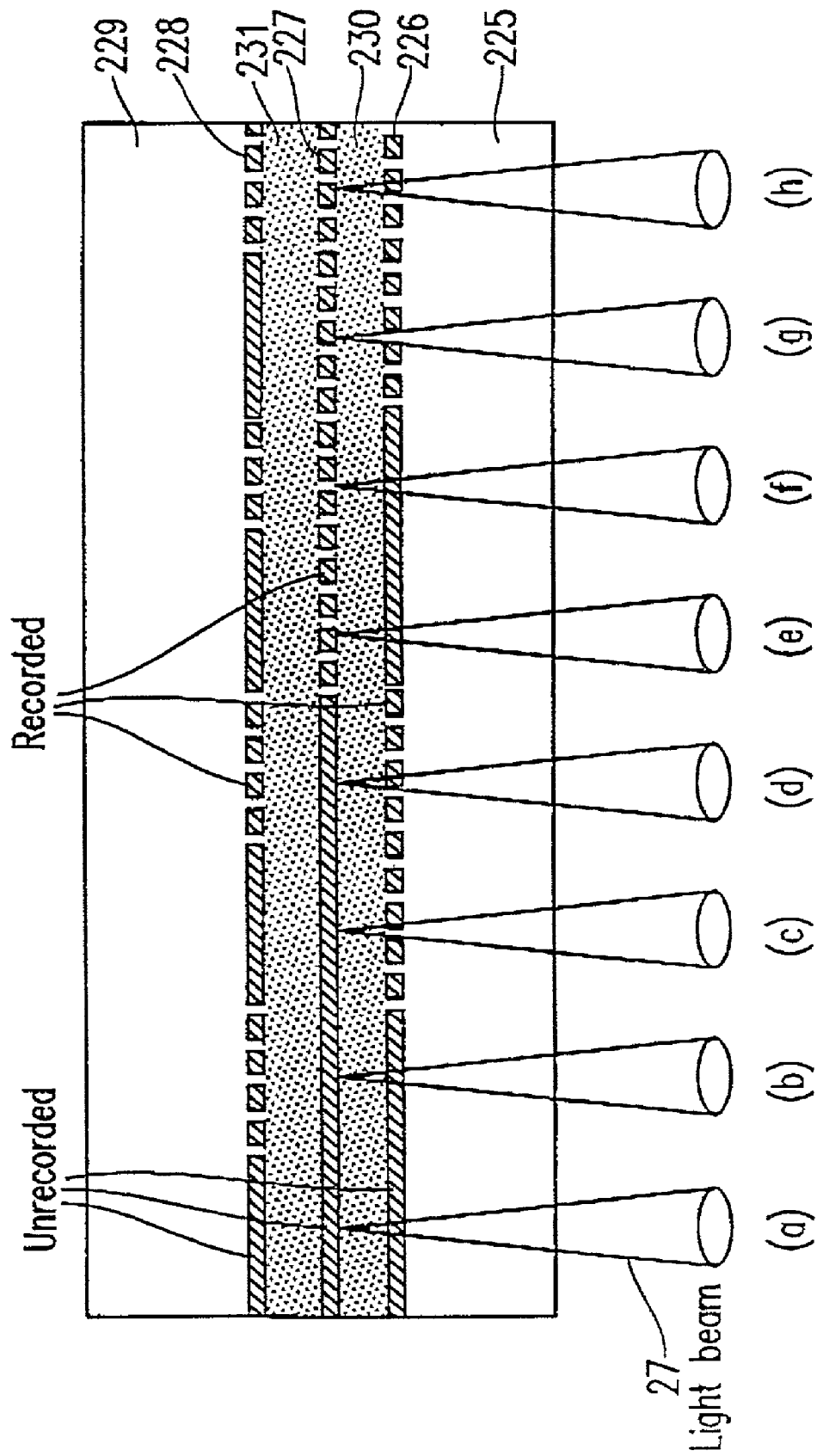
FIG. 10 shows an exemplary cross-section of a test area 92 of the recording medium 1 shown in FIG. 9.

FIG. 10 shows an exemplary cross-section of the test area 92 of the recording medium 1. It is assumed that each of the information layers 226, 227 and 228 randomly includes areas of two states, i.e., an unrecorded state and a recorded state. Eight basic patterns (a) through (h) are recorded in different areas in the radial direction of the test area 92.

For example, basic pattern (b), in which the information layer 226 is unrecorded, the information layer 227 is unrecorded and information layer 228 is recorded, is recorded in the test area 92.

Figure 11:
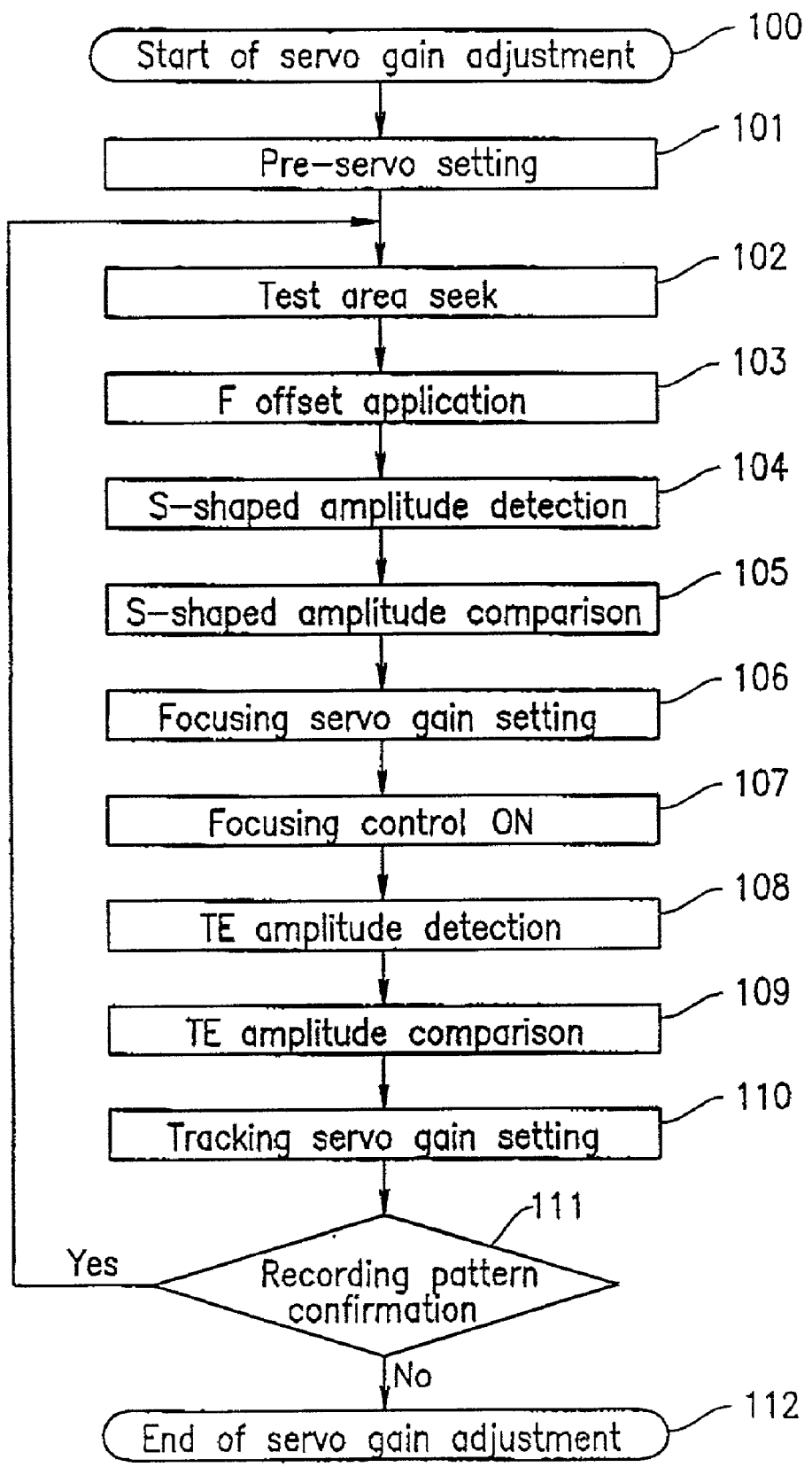
FIG. 11 is a flowchart illustrating a method for adjusting servo gains according to the present invention.

FIG. 11 is a flowchart illustrating the method for adjusting servo gains according to the third example of the present invention. The method is performed by the recording and reproduction apparatus 1000 (FIG. 1).

In the following description, a method for adjusting servo gains for a second information layer (e.g., the information layer 227 in FIG. 10) will be described as an example. The servo gains for the other information layers (e.g., the information layers 226 and 228 in FIG. 10) can also be adjusted in substantially the same manner.

The adjustment of the servo gains is started in response to a signal, output from the operation control system 8, representing the start of the servo gain adjustment.

In a pre-servo setting step 101, the gain setting circuit 32 (FIG. 3) sets an initial value of the focusing servo gain, and the gain setting circuit 52 (FIG. 5) sets an initial value of the tracking servo gain. These initial values are set to be slightly lower than respective optimum servo gains which are pre-set as being optimum for the recording medium 1.

In a test area seek step 102, the optical pickup 3 (FIG. 1) is moved so as to direct the light beam to the test area 92 shown in FIG. 9. For example, it is assumed that the optical pickup 3 is moved so as to direct the light beam to a portion of the test area 92 having basic pattern (a) shown in FIG. 10 recorded therein.

In an F offset application step 103, the focusing driving circuit 33 (FIG. 3) forms an opened loop for focusing control, and causes a prescribed current supplied by the offset circuit 34 (FIG. 3) to flow through the voice coil 15 (FIG. 1). Thus, the objective lens 12 is moved in a direction perpendicular to the surface of the recording medium 1.

In an S-shaped amplitude detection step 104, the S-shaped amplitude detection circuit 35 (FIG. 3) detects an amplitude value of a focusing error signal corresponding to the second information layer.

In an S-shaped amplitude comparison step 105, the gain setting circuit 32 (FIG. 3) compares the amplitude value detected by the S-shaped amplitude detection circuit 35 and the reference amplitude value.

In a focusing servo gain setting step 106, the gain setting circuit 32 (FIG. 3) sets a focusing servo gain based on the comparison result of the detected amplitude value and the reference amplitude value.

In a focusing control ON step 107, the focusing driving circuit 33 (FIG. 3) forms a closed loop for focusing control. As a result, focusing control based on the focusing servo gain is started.

In a TE amplitude detection step 108, the TE amplitude detection circuit 54 (FIG. 5) detects an amplitude value of the tracking error signal.

In a TE amplitude comparison step 109, the gain setting circuit 52 (FIG. 5) compares the amplitude value detected by the TE amplitude detection circuit 54 and the reference amplitude value.

In a tracking servo gain setting step 110, the gain setting circuit 52 (FIG. 5) sets a tracking servo gain based on the comparison result of the detected amplitude value and the reference amplitude value.

By performing steps 102 through 110, the optimum focusing servo gain and the optimum tracking servo gain for one basic pattern (e.g., basic pattern (a) shown in FIG. 10) can be obtained.

In a recording pattern confirmation step 111, it is checked whether or not there is another basic pattern for which the servo gains are to be adjusted for the second information layer. When "yes" results in step 111, steps 102 through 110 are repeated. When "no" results in step 111, the servo gain adjustment is terminated.

For example, for adjusting the servo gains for eight basic patterns (a) through (h) shown in FIG. 10, steps 102 through 110 are repeated 8 times.

As described above, the optimum focusing servo gain and the optimum tracking servo gain for basic patterns recorded in the test area 92 are adjusted in advance. Then, it is determined which of the basic patterns corresponds to the pattern recorded in the information area 91 adjacent to the test area 92. Thus, stable servo control operations can be performed using the optimum servo gains for the recorded pattern.

Next, a method for adjusting servo gains in a shorter time period will be described.

In the above-described method, when the recording medium 1 includes three information layers and there are 8 patterns to be adjusted, steps 102 through 110 shown in FIG. 11 need to be repeated 24 times (3×8=24).

In order to shorten the time period required for the servo gain adjustment, information is recorded on the recording medium 1 from the information layer closest to the side on which the light beam is incident toward the information layer farthest from the side on which the light beam is incident (or from the information layer farthest from the side on which the light beam is incident toward the information layer closest to the side on which the light beam is incident). For example, when, as shown in FIG. 2A, the recording medium 1 includes three information layers 226, 227 and 228, which are stacked in this order from the side on which the light beam is incident, information is recorded from an innermost side toward an outermost side of the information layer 226. When the information layer 226 has no blank area, the information is recorded on the information layer 227. When the information layer 227 has no blank area, the information is recorded on the information layer 228.

When the recording medium 1 is a rewritable disc, it is preferable to provide an entire disc recording identifier in a specific area such as, for example, a control track of the recording medium 1. When recording in all the information layers is completed, a code indicating that recording on all the information layers is completed is recorded in the entire disc recording identifier. By confirming the code recorded in the entire disc recording identifier before recording information on the recording medium 1, the recording pattern recorded on the recording medium 1 can be specified. As a result, the optimum servo gains for the recorded pattern can be selected from the servo gains obtained by adjustment.

According to this method, when recording to all the information layers of the recording medium 1 has not been completed, only the four basic patterns (a), (c), (g) and (h) can exist among the eight basic patterns shown in FIG. 10. Thus, it is sufficient to record these four basic patterns in the test area 92. Therefore, in the case where the recording medium 1 includes three information layers, steps 102 through 110 are repeated only 12 times (3×4=12) for servo gain adjustment. That is, by restricting the order of recording to the information layers, the number of times the steps for servo gain adjustment are repeated can be reduced to half.

For the information layer 227, recording and reproduction based on basic pattern (a) shown in FIG. 10 is not important. For the information layer 228, recording and reproduction based on basic patterns (a) and (c) shown in FIG. 10 is not important. By omitting the servo gain adjustment for these basic patterns for these information layers, the number of repetitions of steps 102 through 110 can be further reduced by three. As a result, the number of times the steps are repeated for servo gain adjustment can be only 9 times.

In an alternative structure, an identifier representing completion of recording for each information layer of the recording medium 1 may be provided, so that each identifier can be confirmed before recording information on the recording medium 1. When, for example, the identifier representing completion of recording to the information layer 226 of the recording medium 1 is detected, the unrecorded state of the information layer 226 need not be considered. Then, the number of times the steps are repeated for servo gain adjustment can be 8 times.

When all the identifiers each representing completion of recording to the respective information layers are detected, servo gain adjustment only for basic pattern (h) (FIG. 10) is necessary. Thus, the number of times the steps are repeated for servo gain adjustment is 3 times (3×1=3).

In the case where information is recorded on the recording medium 1 from the information layer 228 farthest from the side on which the light beam is incident toward the information layer 226 closest to the side on which the light beam is incident, the basic patterns to be adjusted can be narrowed down to the four basic patterns (a), (b), (f) and (h) in a similar manner. As such, the same effect as above is obtained.

By restricting the order of the information layers in which recording is performed as described above, the time period required for servo gain adjustment can be significantly shortened.

EXAMPLE 4

In a fourth example according to the present invention, another method for adjusting servo gains will be described. According to the method described in this example, servo gains are efficiently adjusted for a recording medium having signals recorded in a target information layer or a read only recording medium.

It is assumed that the test area 92 (FIG. 9) of the recording medium 1 has only the four basic patterns (e) through (h) shown in FIG. 10.

Figure 12:
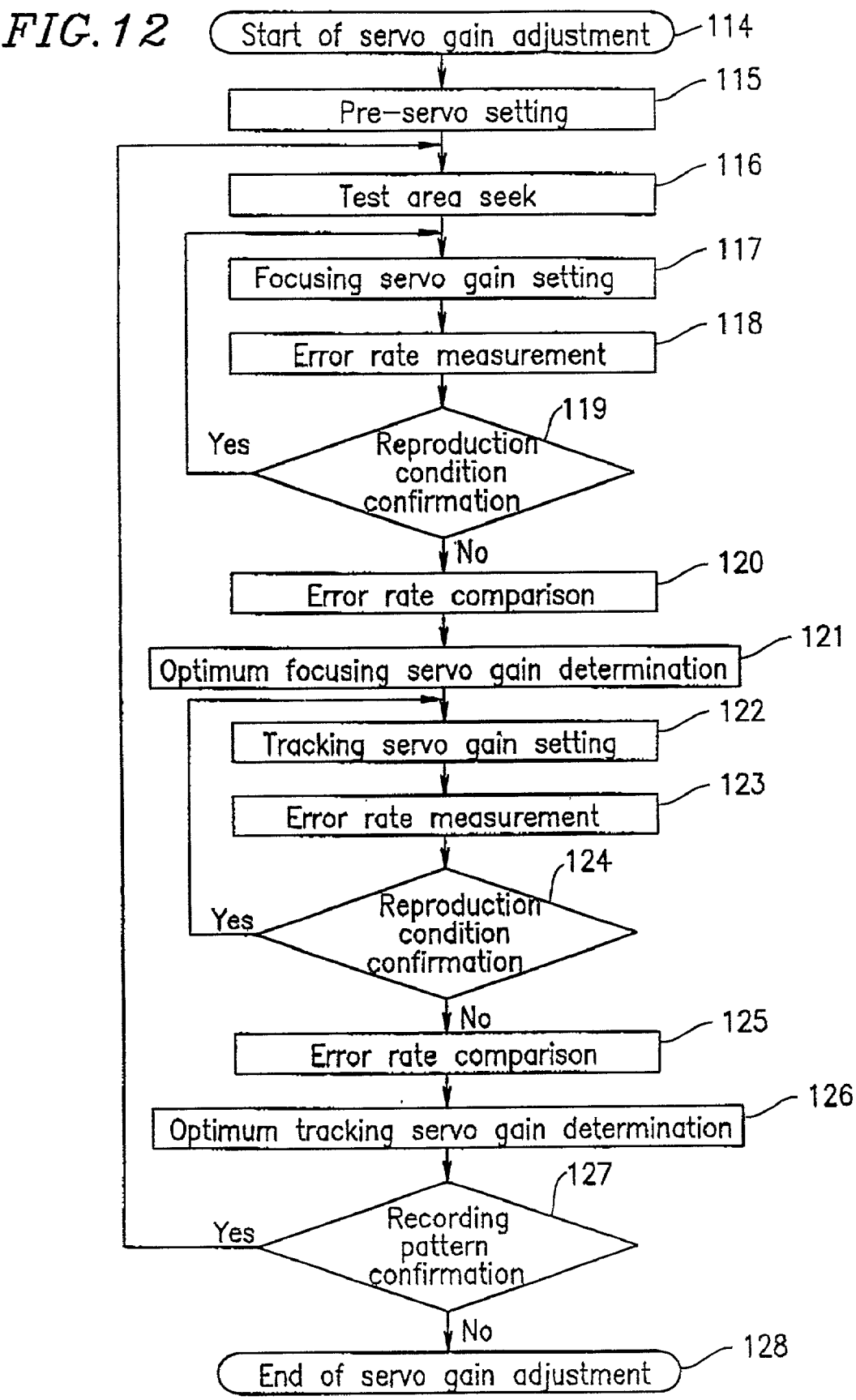
FIG. 12 is a flowchart illustrating another method for adjusting servo gains according the present invention.

FIG. 12 is a flowchart illustrating the method for adjusting servo gains according to the fourth example of the present invention. The method is performed by the recording and reproduction apparatus 1000 (FIG. 1).

In the following description, a method for adjusting servo gains for a second information layer (e.g., the information layer 227 in FIG. 10) will be described as an example. The servo gains for the other information layers (e.g., the information layers 226 and 228 in FIG. 10) can also be adjusted in substantially the same manner.

The adjustment of the servo gains is started in response to a signal, output from the operation control system 8, representing the start of the servo gain adjustment.

In a pre-servo setting step 115, the gain setting circuit 32 (FIG. 3) sets an initial value of the focusing servo gain, and the gain setting circuit 52 (FIG. 5) sets an initial value of the tracking servo gain. These initial values are set to be slightly lower than respective optimum servo gains which are pre-set as being optimum for the recording medium 1.

In a test area seek step 116, the optical pickup 3 (FIG. 1) is moved so as to direct the light beam to the test area 92 shown in FIG. 9. For example, it is assumed that the optical pickup 3 is moved so as to direct the light beam to a portion of the test area 92 having basic pattern (e) shown in FIG. 10 recorded therein.

In a focusing servo gain setting step 117, the gain setting circuit 32 (FIG. 3) selects a first focusing servo gain among a plurality of focusing servo gains prepared in advance and sets the selected focusing servo gain. As a result, the focusing driving circuit 33 (FIG. 3) performs focusing control based on the first focusing servo gain.

In an error rate measurement step 118, the signal reproduction system 6 (FIG. 1) reproduces a signal recorded in the second information layer 227 and measures a demodulation error in the reproduction signal. For example, the decoder 21 (FIG. 1) measures a demodulation error and outputs the measurement result to the gain setting circuit 32 (FIG. 3).

In a reproduction condition confirmation step 119, it is checked whether or not there is another focusing servo gain to be tested for basic pattern (e) shown in FIG. 10. When "yes" results in step 119, steps 117 and 118 are repeated, so as to measure a demodulation error in a reproduction signal for the next focusing servo gain among the plurality of focusing servo gains prepared. When "no" results in step 119, procedure advances to step 120.

In an error rate comparison step 120, the gain setting circuit 32 (FIG. 3) compares a plurality of demodulation errors obtained for the plurality of focusing servo gains prepared.

In an optimum focusing servo gain determination step 121, the gain setting circuit 32 (FIG. 3) determines the focusing servo gain which provides the smallest error rate and is most stable, among the prepared focusing servo gains, as the optimum focusing servo gain. As a result, the focusing driving circuit 33 (FIG. 3) starts focusing control based on the optimum focusing servo gain.

The optimum tracking servo gain is determined in substantially the same manner as follows.

In a tracking servo gain setting step 122, the gain setting circuit 52 (FIG. 5) selects a first tracking servo gain among a plurality of tracking servo gains prepared in advance and sets the selected tracking servo gain. As a result, the tracking driving circuit 53 (FIG. 5) performs tracking control based on the first tracking servo gain.

In an error rate measurement step 123, the signal reproduction system 6 (FIG. 1) reproduces a signal recorded in the second information layer 227 and measures a demodulation error in the reproduction signal. For example, the decoder 21 (FIG. 1) measures a demodulation error and outputs the measurement result to the gain setting circuit 52 (FIG. 5).

In a reproduction condition confirmation step 124, it is checked whether or not there is another tracking servo gain to be tested for basic pattern (e) shown in FIG. 10. When "yes" results in step 124, steps 122 and 123 are repeated, so as to measure a demodulation error in a reproduction signal for the next tracking servo gain among the plurality of tracking servo gains prepared. When "no" results in step 124, procedure advances to step 125.

In an error rate comparison step 125, the gain setting circuit 52 (FIG. 5) compares a plurality of demodulation errors obtained for the plurality of tracking servo gains prepared.

In an optimum tracking servo gain determination step 126, the gain setting circuit 52 (FIG. 5) determines the tracking servo gain which provides the smallest error rate and is most stable, among the prepared tracking servo gains, as the optimum tracking servo gain. As a result, the tracking driving circuit 53 (FIG. 5) starts tracking control based on the optimum tracking servo gain.

By performing the above-described steps 116 through 126, the optimum focusing servo gain and the optimum tracking servo gain for one basic pattern (for example, basic pattern (e) shown in FIG. 10) can be obtained.

In a recording pattern confirmation step 127, it is checked whether or not there is another basic pattern for which the servo gains are to be adjusted for the second information layer. When "yes" results in step 127, steps 116 through 126 are repeated. When "no" results in step 127, servo gain adjustment is terminated.

As described above, the optimum focusing servo gain and the optimum tracking servo gain for basic patterns recorded in the test area 92 are adjusted in advance. Then, it is determined which of the basic patterns corresponds to the pattern recorded in the information area 91 adjacent to the test area 92. Thus, stable servo control operations can be performed using the optimum servo gains for the recorded pattern.

In an alternative method, the relationship between a servo gain when the information layer is in a recorded state and a servo gain when the information layer is in an unrecorded state is obtained in advance. The servo gain when the information layer is in an unrecorded state is obtained from the servo gain when the information layer is in a recorded state.

In this example, the error rate of the reproduction signal is measured, and the servo gain adjustment is performed based on the error rate. The servo gain adjustment may be performed based on information other than the error rate (for example, a jitter value of the reproduction signal).

When the jitter value of the reproduction signal is measured and the servo gain adjustment is performed based on the jitter value, the method illustrated in FIG. 12 is modified as follows. The error rate measurement steps 118 and 123 are replaced with jitter value measurement steps, and the error rate comparison steps 120 and 125 are replaced with jitter value comparison steps. Thus, the servo gain providing the minimum jitter value and is most stable is determined as the optimum servo gain among the plurality of servo gains prepared. Alternatively, the servo gain providing a sufficient jitter value in a certain focusing range can be determined as the optimum servo gain.

A method for measuring a remaining component of each servo gain signal, instead of measuring an error rate, is also effective. For this method, the method illustrated in FIG. 12 may be modified as follows. The error rate measurement step 118 is replaced with a focusing error signal remaining amplitude measurement step, the S-shaped amplitude detection circuit 35 (FIG. 3) is replaced with a focusing remaining amplitude measurement circuit, and the error rate comparison step 120 is replaced with a focusing remaining amplitude comparison step. In the focusing servo gain setting step 117, the level of the focusing servo gain is changed step by step. By the focusing remaining amplitude measurement circuit, the amplitude of the remaining component of the focusing error signal at each level is measured. The best focusing servo gain is found based on the condition in which the amplitude of the remaining component is smallest.

Likewise, for the tracking servo control, the method illustrated in FIG. 12 may be modified as follows. The error rate measurement step 123 is replaced with a tracking error signal remaining amplitude measurement step, the TE amplitude detection circuit 54 (FIG. 5) is replaced with a tracking remaining amplitude measurement circuit, and the error rate comparison step 125 is replaced with a tracking remaining amplitude comparison step. In the tracking servo gain setting step 122, the level of the tracking servo gain is changed step by step. By the tracking remaining amplitude measurement circuit, the amplitude of the remaining component of the tracking error signal at each level is measured. The best tracking servo gain is found based on the condition in which the amplitude of the remaining component is smallest.

The best focusing servo gain which is obtained by using the remaining amplitude of the focusing error signal does not necessarily have the smallest amplitude, depending on the scale or precision of the recording and reproduction apparatus. For example, the best focusing servo gain may be found based on the condition which guarantees a certain operational margin, for example, the condition in which the amplitude of the focusing servo remaining component is not smallest but prevents malfunction even when the focusing servo gain changes to a certain degree. Likewise, the best tracking servo gain may be found based on the condition which guarantees a certain operational margin, for example, the condition in which the amplitude of the tracking servo remaining component is not smallest but prevents malfunction even when the tracking servo gain changes to a certain degree.

The above-described methods for detecting the remaining component of the focusing error signal or the tracking error signal so as to determine the focusing servo gain or the tracking servo gain are effective in that the methods are performed in the state where a closed loop for focusing control or tracking control is formed, and that the servo operation state can be adjusted in consideration of the influence of the other layers.

EXAMPLE 5

In a fifth example according to the present invention, still another method for adjusting servo gains will be described. According to the method described in this example, servo gains are adjusted in two stages.

Figure 13:
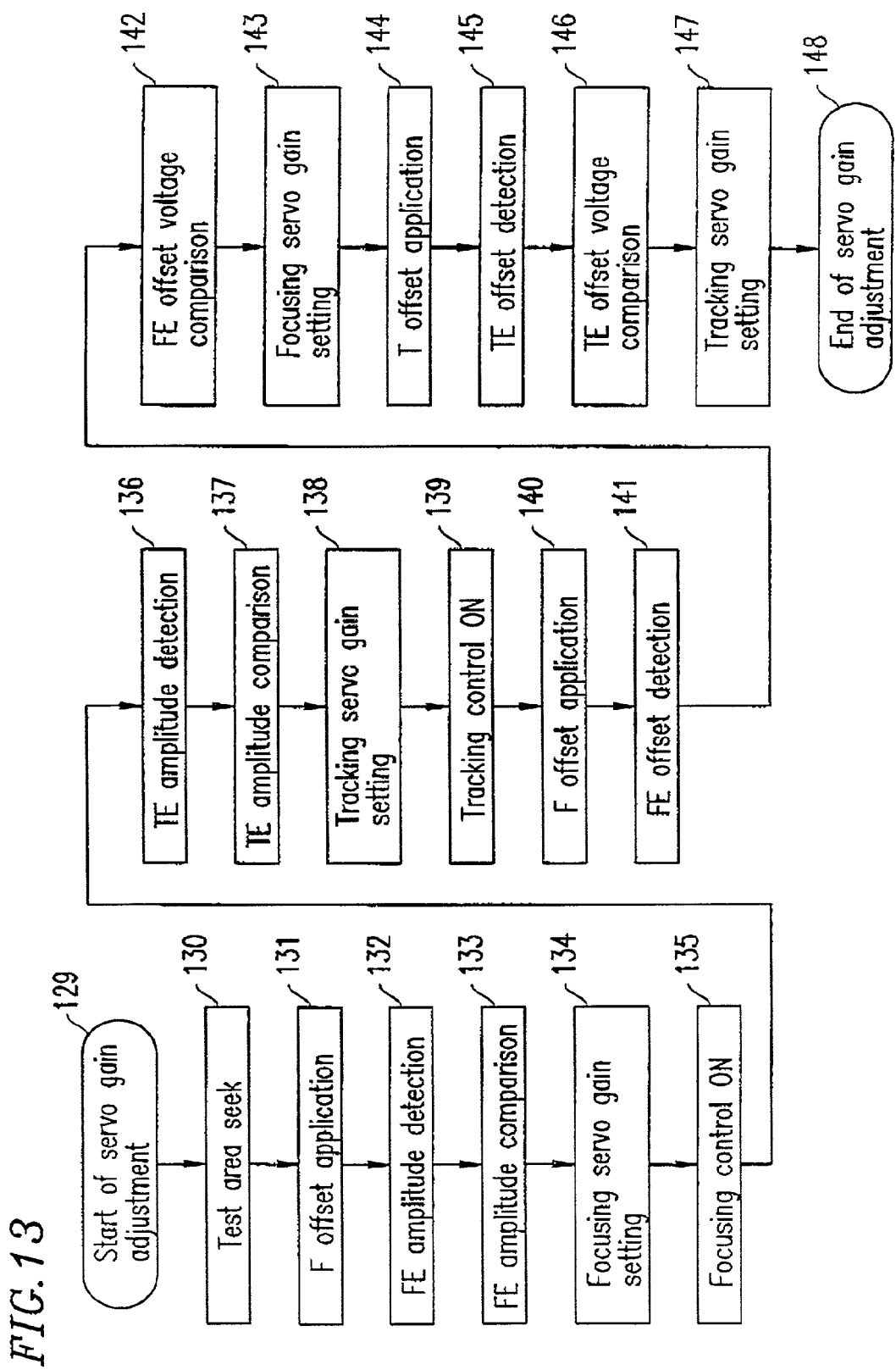
FIG. 13 is a flowchart illustrating still another method for adjusting servo gains according the present invention.
Figure 14:
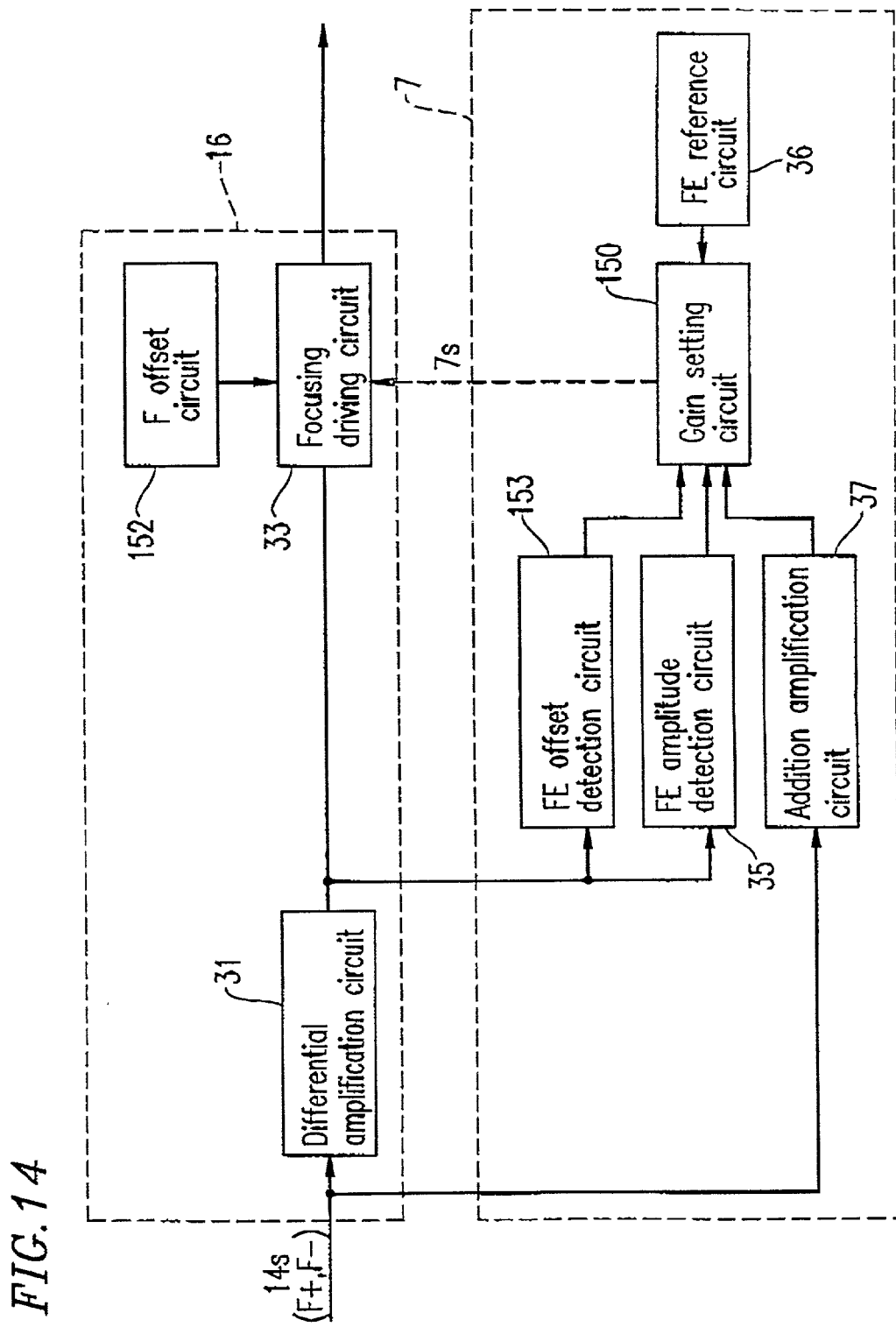
FIG. 14 is a block diagram illustrating another exemplary structure of the focusing control section 16 and the gain setting section 7 according to the present invention.
Figure 15:
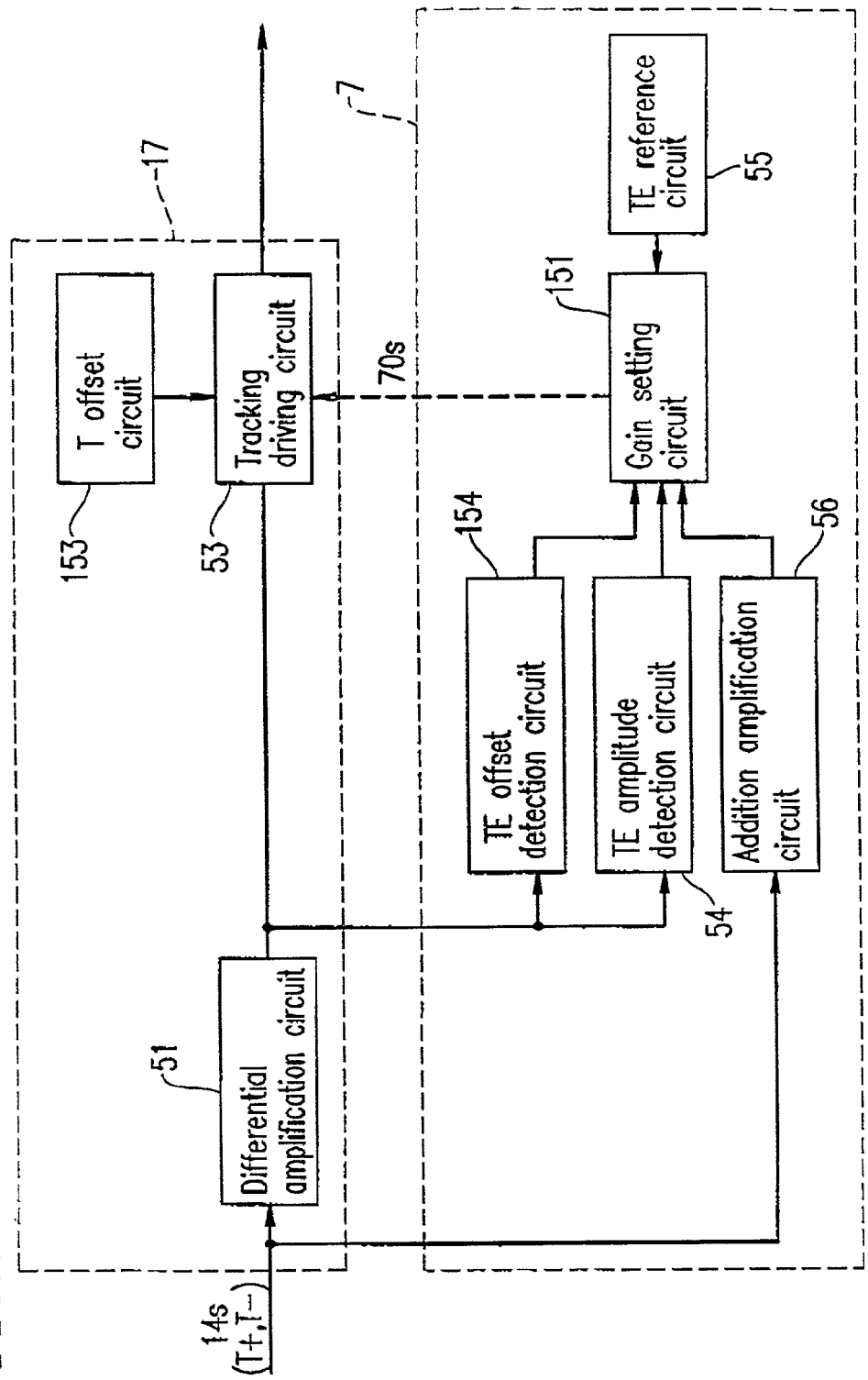
FIG. 15 is a block diagram illustrating still another exemplary structure of the tracking control section 17 and the gain setting section 7 according to the present invention.

FIG. 13 is a flowchart illustrating the method for adjusting servo gains according to the fifth example of the present invention. The method is performed by the recording and reproduction apparatus 1000 (FIG. 1), except that the focusing section 16 and the gain setting section 7 have the structures shown in FIG. 14, and the tracking control section 17 and the gain setting section 7 have the structures shown in FIG. 15.

In the following description, a method for adjusting servo gains for a second information layer (e.g., the information layer 227 in FIG. 10) will be described as an example. The servo gains for the other information layers (e.g., the information layers 226 and 228 in FIG. 10) can also be adjusted in substantially the same manner.

The adjustment of the servo gains is started in response to a signal, output from the operation control system 8, representing the start of the servo gain adjustment.

In a test area seek step 130, the optical pickup 3 (FIG. 1) is moved so as to direct the light beam to the test area 92 or the information area 91 shown in FIG. 9.

In an F offset application setting step 131, the focusing driving circuit 33 (FIG. 14) forms an opened loop for focusing control, and applies an offset voltage supplied by the offset circuit 34 (FIG. 14) to the voice coil 15 (FIG. 1). Thus, the objective lens 12 is moved in a direction perpendicular to the surface of the recording medium 1.

In an FE amplitude detection step 132, an FE amplitude detection circuit 35 (FIG. 14; also referred to as the "S-shaped amplitude detection circuit") detects an amplitude value of a focusing error signal corresponding to the second information layer among focusing error signals generated by the light beams reflected by the plurality of information layers.

In an FE amplitude comparison step 133, a gain setting circuit 150 (FIG. 14) compares the amplitude value detected by the FE amplitude detection circuit 35 and the reference amplitude value.

In a focusing servo gain setting step 134, the gain setting circuit 150 (FIG. 14) sets a focusing servo gain based on the comparison result of the detected amplitude value and the reference amplitude value.

In a focusing control ON step 135, the focusing driving circuit 33 (FIG. 14) forms a closed loop for focusing control. As a result, focusing control based on the focusing servo gain is started.

In a TE amplitude detection step 136, a tracking driving circuit 53 (FIG. 15) forms an opened loop for tracking control so as to move the objective lens 12 in a radial direction of the recording medium 1. The TE amplitude detection circuit 54 (FIG. 15) detects an amplitude value of a tracking error signal.

In a TE amplitude comparison step 137, a gain setting circuit 151 (FIG. 15) compares the amplitude value detected by the TE amplitude detection circuit 54 and the reference amplitude value.

In a tracking servo gain setting step 138, the gain setting circuit 151 (FIG. 15) sets a tracking servo gain based on the comparison result of the detected amplitude value and the reference amplitude value.

In a tracking control ON step 139, the tracking driving circuit 53 (FIG. 15) forms a closed loop for tracking control. As a result, tracking control based on the tracking servo gain is started.

In an F offset application step 140, the focusing driving circuit 33 (FIG. 14) forms a closed loop for focusing control and applies an offset voltage supplied by an F offset circuit 152 (FIG. 14) to the voice coil 15 (FIG. 1). Thus, the objective lens 12 is moved in a direction perpendicular to the surface of the recording medium 1. The value of the offset voltage applied to the voice coil 15 is lower than the value of the offset voltage applied to the voice coil 15 by the F offset application step 131, so that the focusing control operation can maintain the closed loop. As a result, the objective lens 12 is moved in the direction perpendicular to the surface of the recording medium 1 by a shorter distance than the distance in the F offset application step 131.

In an FE offset detection step 141, an FE offset detection circuit 153 (FIG. 14) detects a change amount (FE offset voltage value) of the amplitude value of the FE signal varying in accordance with the offset voltage value applied to the voice coil 15 in the F offset application step 140.

In an FE offset voltage comparison step 142, the gain setting circuit 150 (FIG. 14) compares the FE offset voltage value detected by the FE offset detection circuit 153 (FIG. 14) and a reference offset voltage value. The reference offset voltage value is found in advance as a change amount in the amplitude value of the FE signal varying in accordance with the offset voltage applied to the voice coil 15 when a recording medium including a single information layer is used.

In a focusing servo gain setting step 143, the gain setting circuit 150 (FIG. 14) sets a focusing servo gain based on the comparison result of the detected FE offset voltage value and the reference offset voltage value.

In a T offset application step 144, the T offset circuit 153 (FIG. 15) applies a certain offset voltage to the output of the tracking driving circuit 53 (FIG. 15) so as to move the objective lens 12 in a tracking direction of the recording medium 1 by a fine distance.

In a TE offset detection step 145, a TE offset detection circuit 154 (FIG. 15) detects a change amount (TE offset voltage value) in the amplitude value of the TE signal varying in accordance with the offset voltage value applied to the voice coil 15 in the T offset application step 144.

In a TE offset voltage comparison step 146, the gain setting circuit 151 (FIG. 15) compares the TE offset voltage value detected by the TE offset detection circuit 154 (FIG. 15) and a reference offset voltage value. The reference offset voltage value is found in advance as a change amount in the amplitude value of the TE signal varying in accordance with the offset voltage applied to the voice coil 15 when a recording medium including a single information layer is used.

In a tracking servo gain setting step 147, the gain setting circuit 151 (FIG. 15) sets a tracking servo gain based on the comparison result of the detected TE offset voltage value and the reference offset voltage value.

As described above, the focusing servo gain in two stages (i.e., in the state where an opened loop for focusing control is formed, and then in the state where a closed loop for focusing control is formed). Thus, the focusing servo gain can be obtained more precisely. Likewise, the tracking servo gain is found in two stages (i.e., in the state where an opened loop for tracking control is formed, and then in the state where a closed loop for tracking control is formed). Thus, the tracking servo gain can be obtained more precisely.

By performing steps 130 through 147 for the eight basic patterns (a) through (h) shown in FIG. 10, precise servo gains for these basic patterns can be obtained. As described in the third example, the time period required for servo gain adjustment can be shortened by restricting the order of recording information to the information layers.

In the above examples, the focusing servo gain and the tracking servo gain obtained by the present invention have been described. In the area of each pattern shown FIG. 10, for example, the focusing offset amount and the tracking offset amount can be found in a similar manner as well as the best conditions for the focusing servo gain and the tracking servo gain. In this way, more optimal recording and reproduction conditions can be obtained.

The servo conditions obtained here corresponding to each recording pattern are stored in a system controller, so that the servo conditions are controlled in correspondence with whether each information area is in a recorded state or in an unrecorded state. For a region including areas in a recorded state and areas in an unrecorded state in a complicated manner, it is effective to select intermediate conditions of the above-described recording patterns.

EXAMPLE 6

In a sixth example of the present invention, a method for guaranteeing a stable servo operation by reproducing servo gain information obtained based on whether each information layer of the recording medium is in a recorded state or in a unrecorded state will be described. The servo gain obtained in each of the third, fourth and fifth examples is recorded in a specific area of the recording medium, for example, the management information area 93 (FIG. 9). Substantially the same parameters are applicable to a plurality of servo conditions obtained based on the combination of the recording medium and the recording and reproduction apparatus, unless the recording medium or the recording and reproduction apparatus is deteriorated. Therefore, it is effective for the following reasons to designate the identifier and the servo conditions of the recording and reproduction apparatus in a management information area of the recording medium. In this state, when the recording medium is mounted on the recording and reproduction apparatus, the management information area is reproduced. When there is past data of recording performed by the recording and reproduction apparatus, the reference signal is reproduced with the described servo conditions. When the obtained servo conditions match the contents in the management information area, the servo conditions can be used to perform recording and reproduction. When the obtained servo conditions do not match the contents in the management information area, servo condition adjustment is performed with the servo conditions being varied step by step, in order to obtain the optimum servo conditions. In this manner, the time period required for servo condition adjustment can be shortened for recording mediums frequently used.

The influence of inter-information layer interference slightly varies among individual recording media, but is substantially the same among recording media having the same structure and produced by the same production process. Therefore, it is effective to adjust the servo gain obtained in each of the third, fourth and fifth examples and to record the result of the servo condition adjustment in a management information area (e.g., the management information area 93 shown in FIG. 9) during production of the recording media. The result of the servo condition adjustment can be recorded in the management information area 93 by two methods.

According to a first method, the result of the servo condition adjustment is recorded in the substrate in the form of concave and convex pits, which are generally used in read only recording media. This method is simple since once each servo condition value is obtained in a specific recording medium, it is not necessary to increase the number of production steps for the recording media produced later.

According to a second method, servo condition values are measured and the result of the measurement is recorded in the management information area 93 during production of each recording medium. In this case, the management information area 93 is recordable and reproduceable as the information area 91. As a result, the variance in characteristics among individual recording media is accommodated and thus servo conditions can be set more precisely. As described above, servo gain information including the focusing servo gains and the tracking servo gains corresponding to the unrecorded state and the recorded state of each information layer are obtained during the production of the recording medium 1, and are recorded in the management information area 93 on the recording medium 1 by the first method or the second method. Therefore, when the user mounts the recording medium 1 on the recording and reproduction apparatus 1000 in order to record an information signal on or reproduce an information signal from the recording medium 1, the servo gain information recorded in the management information area 93 can be immediately read so as to start the operation. Thus, the time required by the recording and reproduction apparatus for servo gain adjustment of can be shortened.

The above-described six examples of the present invention are for obtaining servo conditions for the second information layer among the three information layers. The present invention is applicable to the other information layers, and also applicable to all types of recording media including a plurality of information layers.

According to the present invention, when the focusing servo gain and the tracking servo gain fluctuate depending on whether the non-target information layer(s) is in a recorded state or in an unrecorded state, the focusing servo gain is compensated for by using a focusing error signal corresponding to a target information layer, and the tracking servo gain is compensated for by using a tracking error signal. Thus, the present invention provides a stable servo control operation of a multi-layered recording medium.

Various other modifications will be apparent to and can be readily made by those skilled in the art without departing from the scope and spirit of this invention. Accordingly, it is not target that the scope of the claims appended hereto be limited to the description as set forth herein, but rather that the claims be broadly construed.

What is claimed is:

1. A recording and reproduction apparatus for a recording medium including a plurality of information layers, the recording and reproduction apparatus comprising:
   a focusing signal generation section for generating a focusing signal F+ and a focusing signal F− in accordance with a light beam reflected by the recording medium;
   a focusing control section for generating a focusing error signal in accordance with a difference between the focusing signal F+ and the focusing signal F−, and performing focusing control for maintaining a distance between a focal point of the light beam directed to the recording medium and a target information layer among the plurality of information layers within a prescribed tolerable range in accordance with the focusing error signal; and
   a gain setting section for setting a focusing servo gain in accordance with the focusing error signal,
   wherein the focusing signal generation section generates the focusing signal F+ and the focusing signal F− so that a component of the focusing signal F+ and a component of the focusing signal F− which are based on the light beam reflected by an information layer other than the target information layer have substantially an equal value to each other while the focusing control section is performing the focusing control.

2. A recording and reproduction apparatus according to claim 1, wherein the gain setting section includes:
   an amplitude detection circuit for detecting an amplitude value of the focusing error signal corresponding to the target information layer in the state where an opened loop for the focusing control is formed; and
   a gain setting circuit for comparing the amplitude value detected by the amplitude detection section and a reference amplitude value, and setting a focusing servo gain in accordance with the comparison result.

3. A recording and reproduction apparatus according to claim 2, further comprising an optical pickup for moving the focal point of the light beam in a direct ion perpendicular to a surface of the recording medium, wherein the amplitude detection circuit detects the amplitude of the focusing error signal while the focal point of the light beam is moving in a direction perpendicular to the recording medium.

4. A recording and reproduction apparatus for a recording medium including a plurality of information layers, the recording and reproduction apparatus comprising:

a tracking signal generation section for generating a tracking signal T+ and a tracking signal T− in accordance with a light beam reflected by the recording medium;

a tracking control section for generating a tracking error signal in accordance with a difference between the tracking signal T+ and the tracking signal T−, and performing tracking control for causing the light beam directed to the recording medium to follow one of a plurality of tracks formed on a target information layer among the plurality of information layers; and a gain setting section for setting a tracking servo gain in accordance with the tracking error signal, wherein the tracking signal generation section generates the tracking signal T+ and the tracking signal T− so that a component of the tracking signal T+ and a component of the tracking signal T− which are based on the light beam reflected by an information layer other than the target information layer have substantially an equal value to each other while the tracking control section is performing the tracking control.

5. A recording and reproduction apparatus according to claim 4, wherein the gain setting section includes:

an amplitude detection circuit for detecting an amplitude value of the tracking error signal corresponding to the target information layer in the state where an opened loop for the tracking control is formed; and a gain setting circuit for comparing the amplitude value detected by the amplitude detection circuit and a reference amplitude value, and setting a tracking servo gain in accordance with the comparison result.

6. A recording and reproduction apparatus according to claim 4, wherein:

the plurality of tracks include wobble tracks meandering at a prescribed cycle in a track direction, and the gain setting section includes:

an amplitude detection circuit for detecting an amplitude value of a wobble signal included in the tracking error signal in the state where a closed loop for the tracking control is formed; and a gain setting circuit for comparing the amplitude value detected by the amplitude detection circuit and a reference amplitude value, and setting a tracking servo gain in accordance with the comparison result.

7. A recording and reproduction apparatus according to claim 6, wherein the gain setting circuit further sets a focusing servo gain in accordance with the comparison result.

8. A recording and reproduction method for a recording medium including a plurality of information layers, the recording and reproduction method comprising the steps of:

generating a focusing signal F+ and a focusing signal F− in accordance with a light beam reflected by the recording medium;

generating a focusing error signal in accordance with a difference between the focusing signal F+ and the focusing signal F−, and performing focusing control for maintaining a distance between a focal point of the light beam directed to the recording medium and a target information layer among the plurality of information layers within a prescribed tolerable range in accordance with the focusing error signal; and setting a focusing servo gain in accordance with the focusing error signal, wherein a component of the focusing signal F+ and a component of the focusing signal F− which are based on the light beam reflected by an information layer other than the target information layer have substantially an equal value to each other while the focusing control section is performing the focusing control.

9. A recording and reproduction method for a recording medium including a plurality of information layers, the recording and reproduction method comprising the steps of:

generating a tracking signal T+ and a tracking signal T− in accordance with a light beam reflected by the recording medium;

generating a tracking error signal in accordance with a difference between the tracking signal T+ and the tracking signal T−, and performing tracking control for causing the light beam directed to the recording medium to follow one of a plurality of tracks formed on a target information layer among the plurality of information layers; and setting a tracking servo gain in accordance with the tracking error signal, wherein a component of the tracking signal T+ and a component of the tracking signal T− which are based on the light beam reflected by an information layer other than the target information layer have substantially an equal value to each other while the tracking control section is performing the tracking control.

* * * * *

UNITED STATES PATENT AND TRADEMARK OFFICE
CERTIFICATE OF CORRECTION

PATENT NO. : 6,952,382 B2
DATED : October 4, 2005
INVENTOR(S) : Kenichi Nishiuchi It is certified that error appears in the above-identified patent and that said Letters Patent is hereby corrected as shown below:

Column 29,
Line 3, "direct ion" should read -- direction --.

Signed and Sealed this

Seventh Day of March, 2006

JON W. DUDAS
*Director of the United States Patent and Trademark Office*